(12) United States Patent
Han et al.

(10) Patent No.: US 12,130,078 B2
(45) Date of Patent: Oct. 29, 2024

(54) ARTIFICIAL INTELLIGENCE ENABLED FOOD REFRIGERATING DEVICE

(71) Applicant: LG ELECTRONICS INC., Seoul (KR)

(72) Inventors: Junsoo Han, Seoul (KR); Cholok Han, Seoul (KR); Younghun Yang, Seoul (KR); Junseong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1032 days.

(21) Appl. No.: 17/086,992

(22) Filed: Nov. 2, 2020

(65) Prior Publication Data

US 2021/0199371 A1 Jul. 1, 2021

(30) Foreign Application Priority Data

Dec. 31, 2019 (KR) .......................... 10-2019-0179554

(51) Int. Cl.
| | |
|---|---|
| *F25D 29/00* | (2006.01) |
| *F25D 11/02* | (2006.01) |
| *G06N 20/00* | (2019.01) |
| *G06V 10/20* | (2022.01) |
| *G06V 20/10* | (2022.01) |

(Continued)

(52) U.S. Cl.
CPC .............. *F25D 29/00* (2013.01); *F25D 11/02* (2013.01); *G06N 20/00* (2019.01); *G06V 10/255* (2022.01); *G06V 20/10* (2022.01); *G06V 20/52* (2022.01); *G16Y 40/35* (2020.01); *F25D 2500/04* (2013.01); *F25D 2500/06* (2013.01); *F25D 2600/02* (2013.01); *F25D 2600/06* (2013.01); *F25D 2700/06* (2013.01);

(Continued)

(58) Field of Classification Search
CPC .. F25D 29/00; F25D 2500/04; F25D 2600/02; F25D 2600/06; F25D 2700/06; F25D 2700/121; G06V 10/255; G16Y 40/35
USPC ........................................................ 700/300
See application file for complete search history.

(56) References Cited

U.S. PATENT DOCUMENTS

2016/0370105 A1* 12/2016 Park ..................... F25D 25/025
2018/0080702 A1* 3/2018 Wilson .................. F25D 17/065
(Continued)

FOREIGN PATENT DOCUMENTS

EP 3124901 A1 * 2/2017 ............. F25D 29/00

OTHER PUBLICATIONS

Intelligent Refrigerator Using Artificial Intelligence, 2017 11 th International Conference on Intelligent Systems and Control (ISCO), By: Shweta A.S (Year: 2017).*

*Primary Examiner* — Jigneshkumar C Patel
(74) *Attorney, Agent, or Firm* — LEE, HONG, DEGERMAN, KANG & WAIMEY

(57) ABSTRACT

An artificial intelligent food refrigerating device and a method for refrigerating food by using the same are disclosed. An artificial intelligent food refrigerating device according to the present disclosure identifies the size, volume, type, and quantity of food to be put into it and determines a target refrigeration temperature and refrigeration time for the food based on an identification result. The artificial intelligent food refrigerating device and method according to the present disclosure may be associated with an artificial intelligent module, a robot, an augmented reality (AR) device, a virtual reality (VR) device, a 5G service-related device, etc.

19 Claims, 16 Drawing Sheets

(51) Int. Cl.
*G06V 20/52* (2022.01)
*G16Y 40/35* (2020.01)
*G06V 20/68* (2022.01)

(52) U.S. Cl.
CPC .. *F25D 2700/121* (2013.01); *F25D 2700/123* (2013.01); *F25D 2700/16* (2013.01); *G06V 20/68* (2022.01)

(56) References Cited

U.S. PATENT DOCUMENTS

| | | | |
|---|---|---|---|
| 2018/0224183 A1* | 8/2018 | Besore | F25D 17/065 |
| 2021/0131718 A1* | 5/2021 | Jeong | H04N 7/183 |

* cited by examiner

ARTIFICIAL INTELLIGENCE ENABLED FOOD REFRIGERATING DEVICE

CROSS-REFERENCE TO RELATED APPLICATION

Pursuant to 35 U.S.C. § 119(a), this application claims the benefit of earlier filing date and right of priority to Korean Patent Application No. 10-2019-0179554, filed on Dec. 31, 2019, the contents of which are hereby incorporated by reference herein in its entirety.

BACKGROUND OF THE DISCLOSURE

Field of the Disclosure

The present disclosure relates to an artificial intelligent food refrigerating device capable of refrigerating food by setting different refrigeration temperatures for different types of food.

Related Art

A refrigerator is generally an appliance used for keeping items for storage such as food, drinks, etc. fresh for a long time, which freezes or refrigerates items for storage the user wants to store depending on their type.

A refrigerator works by running a compressor provided inside it. Cool air supplied into the refrigerator is generated by a heat transfer action of refrigerant, and is continuously supplied into the refrigerator through repetition of a cycle of compression-condensation-expansion-evaporation.

The supplied cool air is evenly transferred throughout the inside of the refrigerator by convection so that the temperature inside the refrigerator is kept constant. The food is therefore kept at a constant temperature in the refrigerator and stopped from rotting. This cycle depends on the configuration of a refrigeration cycle device comprising a refrigerator.

As recent climate changes are leading to more hot days in summer, the consumption of summer drinks is rapidly increasing. In summer, when a consumer buys a food item from a store that has been kept at a low temperature, it needs to be brought home as soon as possible. However, the temperature of the food item being carried will rise quickly due to hot weather, and the food will get lukewarm or even not edible by the time it gets home.

If the temperature of a food item becomes lower on the way home, the consumer will usually put the food in the freezer compartment to cool it faster. However, the freezer compartment does not display an alarm indicating the completion of cooling of food, and the consumer tends to leave the food there without knowing that the cooling is completed. As a result, the food sitting neglected in the freezer compartment will freeze and therefore cannot be cooked straight from the freezer compartment when required.

SUMMARY OF THE DISCLOSURE

The present disclosure aims at solving the aforementioned needs and/or problems.

The present disclosure also aims at providing an artificial intelligent food refrigerating device that itself is capable of checking the type, size, volume, and quantity of food, setting a target refrigeration temperature suitable for the food, and refrigerating the food to the target refrigeration temperature.

An exemplary embodiment of the present disclosure provides an artificial intelligent food refrigerating device comprising: a main body connectable to an artificial intelligent refrigerator; a container formed inside the main body into which food is put; a door for opening and closing the container; an image capture unit for capturing an image of the inside of the container and the food; a second sensing unit for measuring status information of the inside and outside of the container; a second temperature regulating unit for regulating the temperature inside the container; a third communication unit for performing data communication with at least one between the artificial intelligent refrigerator and user equipment; and a controller for regulating the temperature inside the container by controlling the second temperature regulating unit, wherein the controller may recognize the size, volume, type, and quantity of the food to be put into the container through the image and regulate the temperature inside the container according to a recognition result.

The controller may determine a first food temperature representing the temperature of the food before the food is put into the container, a second food temperature, which is a target refrigeration temperature the food has to reach, a first container temperature representing the temperature inside the container, for achieving the second food temperature, and a first time required to achieve the second food temperature, according to the recognition result.

If the food is identified as liquid based on the recognition result, the controller may determine the second food temperature within a first range, and, if the food is identified as solid based on the recognition result, the controller may determine the second food temperature within a second range.

The first range and the second range may be determined based on learning results produced from the recognition result by machine learning.

If the food is identified as liquid based on the recognition result, the controller may determine the first time within a third range, and, if the food is identified as solid based on the recognition result, the controller may determine the first time within a fourth range.

The third range and the fourth range may be determined based on learning results produced from the recognition result by machine learning.

The image capture unit may further comprise an FLIR camera, wherein the FLIR camera may generate a first image by capturing the food before or at the moment when the food is put into the container, and the controller determines the first temperature for the food by analyzing the first image.

The FLIR camera may generate a second image by periodically capturing the food being stored in the container, and the controller may identify a change in the temperature of the food being stored in the container by analyzing the second image.

The first food temperature, the second food temperature, and the first time may be outputted through at least one between the artificial intelligent refrigerator and the user equipment.

The main body may comprise a mesh structure on at least one side, wherein the mesh structure may be configured such that cool air moves to the container from a cool air outlet of the artificial intelligent refrigerator.

The main body may comprise a connecting portion that can be attached around the cool air outlet, wherein the mesh structure may be disposed to come into contact with or close to the cool air outlet by means of the connecting portion.

The second temperature regulating unit may comprise a fan for letting air into the container, wherein the controller may control the operation mode of the fan according to the recognition result.

The second temperature regulating unit may further comprise a damper for opening and closing one side of the container, wherein the controller may control the operating status of the damper by taking into consideration at least one among the recognition result, the temperature inside the container, the operation mode of the fan, and the temperature of the refrigeration compartment of the artificial intelligent refrigerator.

The damper may comprise a plurality of blades, wherein the plurality of blades may be disposed in parallel on one side of the main body and configured to rotate within a given angular range.

The controller may determine the temperature outside the container as the first food temperature.

The second sensing unit may further comprise: a third temperature sensor for measuring the temperature outside the container; and a fourth temperature sensor for measuring the temperature inside the container and the temperature of the food located in the container, wherein the controller may monitor a change in the temperature of the food located inside the container through the fourth temperature sensor.

Another exemplary embodiment of the present disclosure provides a method for refrigerating food by using an artificial intelligent refrigerating device, the method comprising: checking whether the food has been put into a container of the refrigerating device; once it is decided that the food has been put into the container, checking the size, volume, type, and quantity of the food; calculating a second food temperature, which is a target refrigeration temperature the food has to reach, and a first time required to achieve the second food temperature; regulating the temperature inside the container by controlling a second temperature regulating unit by a controller, in order to refrigerate the food; and displaying the second food temperature and the first time to a user.

The checking of the size, volume, type, and quantity of the food may further comprise determining a first food temperature representing the temperature of the food before the food is put into the container, wherein the determining of a first food temperature may comprise determining the first food temperature by analyzing, by the controller, a first image captured of the food by an FLIR camera before the food is put into the container, or determining the temperature outside the container as the first food temperature.

The regulating of the temperature inside the container may further comprise: controlling the operation mode of a fan; and controlling the operation mode of a damper, wherein the operation mode of the fan may comprise at least one fan operation mode classified based on the RPM of the fan, and the operation mode of the damper may comprise at least one damper operation mode classified based on the angles of rotation of blades comprised in the damper.

The displaying of the second food temperature and the first time to a user may comprise: sending information about the second food temperature and the first time to at least one between an artificial intelligent refrigerator and user equipment, both of which are capable of data communication with the refrigerating device; and outputting the second food temperature and the first time through at least one between the artificial intelligent refrigerator and the user equipment.

An artificial intelligent food refrigerating device and method according to the present disclosure enable fast refrigeration of food the user wants to eat, rather than storing and cooling the food in the freezer compartment.

An artificial intelligent food refrigerating device and method according to the present disclosure allow the user themselves to set a target refrigeration temperature for food through user equipment and let the user know that refrigeration is completed by providing a notification on the user equipment when the food reaches the target refrigeration temperature.

An artificial intelligent food refrigerating device and method according to the present disclosure allow the user to easily know when is the right time to eat a food item stored in the device since the time required for the food to reach the target refrigeration temperature is displayed on the user equipment.

An artificial intelligent food refrigerating device and method according to the present disclosure prevent stored food from freezing due to too much refrigeration by regulating the temperature inside the container storing the food to maintain the same temperature as the refrigeration compartment in the artificial intelligent refrigerator, once the stored food reaches the target refrigeration temperature.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted.

The suffixes "module" and "unit" of elements herein are used for convenience of description and thus can be used interchangeably and do not have any distinguishable meanings or functions.

Further, in the following description, if a detailed description of known techniques associated with the present disclosure would unnecessarily obscure the gist of the present disclosure, detailed description thereof will be omitted.

In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element.

When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
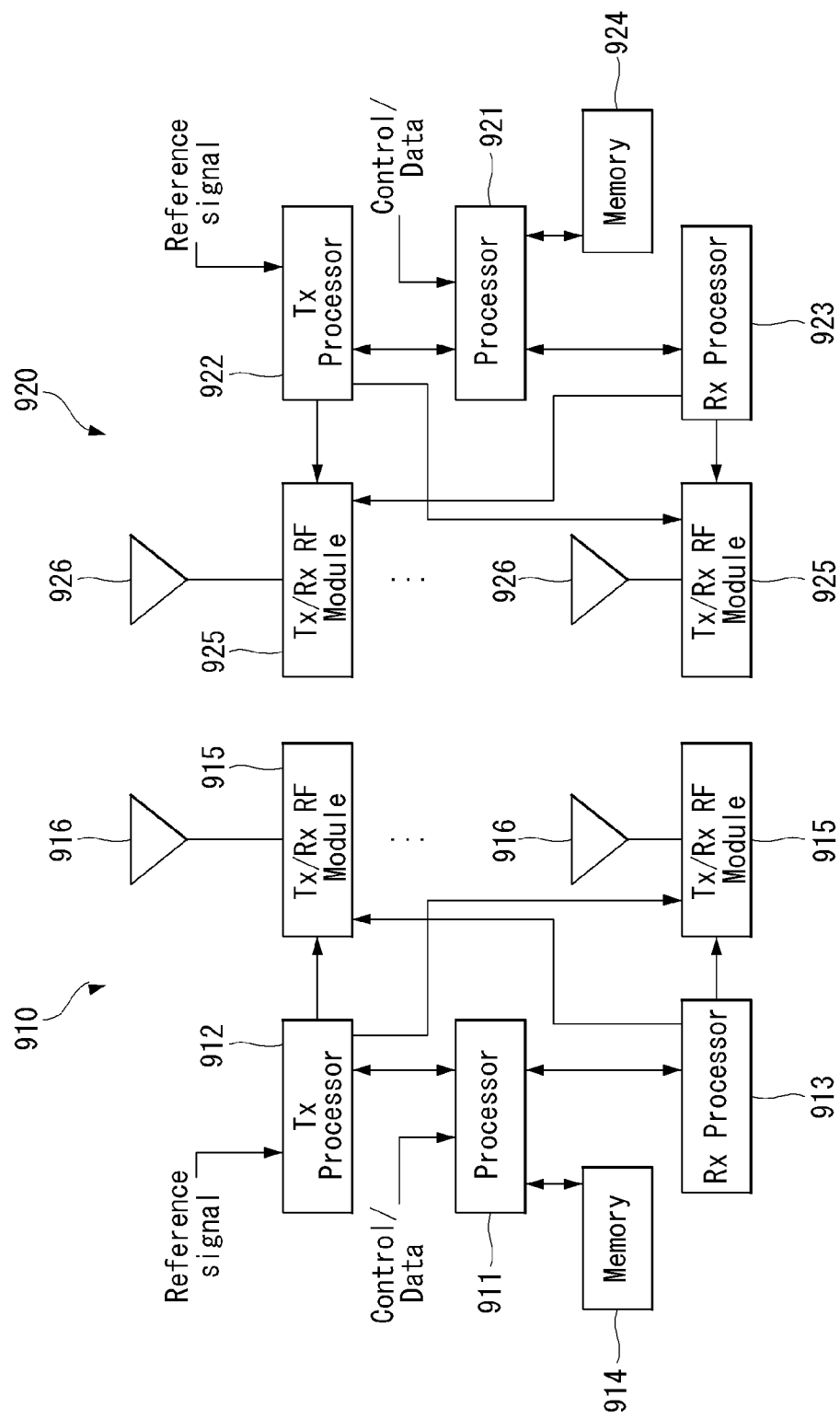
FIG. 1 is a block diagram of a wireless communication system to which methods proposed in the present disclosure are applicable.

FIG. 1 is a block diagram of a wireless communication system to which methods proposed in the present disclosure are applicable.

Referring to FIG. 1, a device (AI device) comprising an AI module is defined as a first communication device (910 of FIG. 1), and a processor 911 may perform detailed AI operations.

A 5G network comprising another device (AI server) communicating with the AI device is defined as a second communication device (920 of FIG. 1), and a processor 921 may perform detailed AI operations.

The 5G network may be represented as the first communication device, and the AI device may be represented as the second communication device.

For example, the first communication device or the second communication device may be a base station, a network node, a transmitting terminal, a receiving terminal, a wireless device, a wireless communication device, an AI (artificial intelligent) device, or the like.

For example, a terminal or user equipment (UE) may include a cellular phone, a smart phone, a laptop computer, a digital broadcast terminal, a personal digital assistant (PDA), a portable multimedia player (PMP), a navigation device, a slate PC, a tablet PC, an ultrabook, a wearable device (e.g., a smartwatch, a smart glass, or a head mounted display (HMD)), etc. For example, the HMD may be a display device worn on the head of a user.

For example, the HMD may be used to realize VR, AR or MR. Referring to FIG. 1, the first communication device 910 and the second communication device 920 comprise processors 911 and 921, memories 914 and 924, one or more Tx/Rx radio frequency (RF) modules 915 and 925, TX processors 912 and 922, RX processors 913 and 923, and antennas 916 and 926. The Tx/Rx module is also referred to as a transceiver.

Each Tx/Rx module 915 transmits a signal through each antenna 916 and 926. The processor implements the aforementioned functions, processes, and/or methods. The processor 921 may be associated with the memory 924 which stores program codes and data. The memory may be referred to as a computer-readable medium.

More specifically, the Tx processor 912 implements various signal processing functions for an L1 layer (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be associated with the memory 924 which stores program code and data. The memory may be referred to as a computer-readable medium.

B. Signal Transmission/Reception Method in Wireless Communication System

Figure 2:
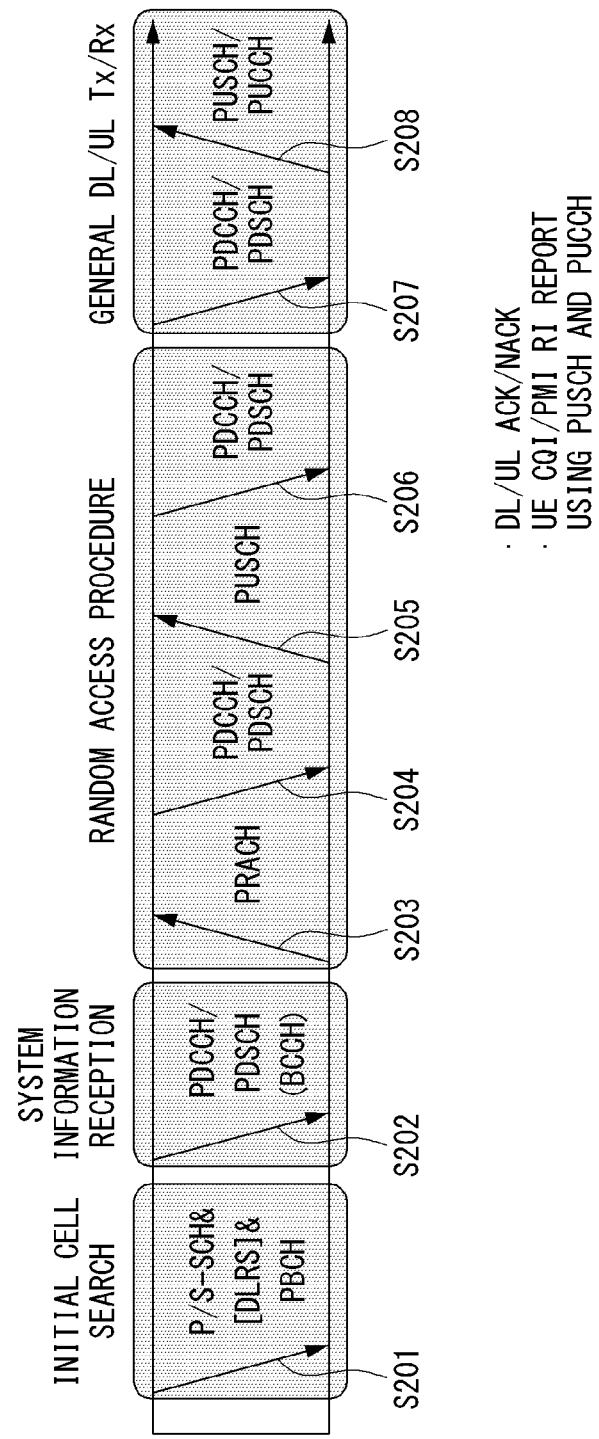
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID.

In LTE and NR systems, the P-SCH and S-SCH are respectively called a primary synchronization signal (PSS) and a secondary synchronization signal (SSS). After initial cell search, the UE can acquire in-cell broadcast information by receiving a physical broadcast channel (PBCH) from the BS.

Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206).

To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the above-described process, the UE can perform PDCCH/PDSCH reception (S207) and physical uplink shared channel (PUSCH)/physical uplink control channel (PUCCH) transmission (S208) as normal uplink/downlink signal transmission processes.

Particularly, the UE receives downlink control information (DCI) through the PDCCH. The UE monitors a set of PDCCH candidates in monitoring occasions set for one or more control element sets (CORESET) on a serving cell according to corresponding search space configurations.

A set of PDCCH candidates to be monitored by the UE is defined in terms of search space sets, and a search space set may be a common search space set or a UE-specific search space set. CORESET includes a set of (physical) resource blocks having a duration of one to three OFDM symbols.

A network can configure the UE such that the UE has a plurality of CORESETs. The UE monitors PDCCH candidates in one or more search space sets. Here, monitoring means attempting decoding of PDCCH candidate(s) in a search space.

When the UE has successfully decoded one of PDCCH candidates in a search space, the UE determines that a PDCCH has been detected from the PDCCH candidate and performs PDSCH reception or PUSCH transmission on the basis of DCI in the detected PDCCH.

The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. The PSS and the SSS each includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group, and the SSS is used to detect a cell ID group. The PBCH is used to detect an SSB (time) index and a half-frame.

There are 336 cell ID groups, and there are 3 cell IDs per cell ID group. A total of 1008 cell IDs are present. Information on a cell ID group to which a cell ID of a cell belongs is provided/acquired through an SSS of the cell, and information on the cell ID among the cell IDs in the 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). The SI except for the MIB may be referred to as remaining minimum system information.

The MIB includes information/parameters for monitoring a PDCCH that schedules a PDSCH carrying SIB1 (SystemInformationBlock1) and is transmitted on a PBCH of an SSB by a BS.

SIB1 includes information related to the availability and scheduling (e.g., transmission periodicity and SI-window size) of the remaining SIBs (hereinafter, SIBx, where x is an integer equal to or greater than 2). SiBx is included in an SI message and transmitted on a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure.

The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz, and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted.

Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1.

The presence or absence of random access information with respect to Msg1 transmitted by the UE can be determined according to the presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

ABM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

The configuration of a beam report using an SSB is performed when channel state information (CSI)/beam is configured in RRC_CONNECTED.

- A UE receives a CSI-ResourceConfig 1E including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, ... }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and its corresponding RSRP to the BS. For example, when reportQuantity of the CSI-RS reportConfig 1E is set to 'ssb-Index-RSRP', the UE reports the best SSBRI and its corresponding RSRP to the BS.
- When a CSI-RS resource is configured in the same OFDM symbol(s) as an SSB and 'QCL-TypeD' is applicable, the UE can assume that the CSI-RS and the SSB are quasi co-located (QCL) from the viewpoint of 'QCL-TypeD'.

Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on a resource(s) in a CSI-RS resource set in which the RRC parameter 'repetition' is set to 'ON' in different OFDM symbols through the same Tx beam (or DL spatial domain transmission filter) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is set to 'OFF', and is related to the Tx beam swiping procedure of the BS.
- The UE receives signals on resources in a CSI-RS resource set in which the RRC parameter 'repetition' is set to 'OFF' through different Tx beams (DL spatial domain transmission filters) of the BS.
- The UE selects (or determines) the best beam.
- The UE reports an ID (e.g., CRI) of the selected beam and related quality information (e.g., RSRP) to the BS. That is, when a CSI-RS is transmitted for BM, the UE reports a CRI and its corresponding RSRP to the BS.

Next, the UL BM procedure using an SRS will be described.

- A UE receives RRC signaling (e.g., SRS-Config 1E) including a (RRC parameter) purpose parameter set to 'beam management" from a BS. The SRS-Config 1E is used to set SRS transmission. The SRS-Config 1E includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config 1E.

Here, SRS-SpatialRelation Info is set for each SRS resource and indicates whether the same beamforming as that used for an SSB, a CSI-RS or an SRS will be applied for each SRS resource.

- When SRS-SpatialRelationlnfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement, or beamforming blockage of a UE. Accordingly, NR supports BFR in order to prevent frequent occurrence of RLF.

BFR is similar to a radio link failure recovery procedure, and may be supported when a UE knows new candidate beam(s). For beam failure detection, a BS configures beam failure detection reference signals for a UE, and the UE declares beam failure when the number of beam failure indications from the physical layer of the UE reaches a threshold set through RRC signaling within a period set through RRC signaling of the BS.

After beam failure detection, the UE triggers beam failure recovery by initiating a random access procedure in a PCell, and performs beam failure recovery by selecting a suitable beam (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR may refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc.

In the case of UL, transmission of traffic of a specific type (e.g., URLLC) needs to be multiplexed with another transmission (e.g., eMBB) scheduled in advance in order to satisfy more stringent latency requirements.

In this regard, information indicating preemption of specific resources is provided to a UE scheduled in advance, and an URLLC UE is allowed to use the resources for UL transmission.

NR supports dynamic resource sharing between eMBB and URLLC. eMBB and URLLC services may be scheduled on non-overlapping time/frequency resources, and URLLC transmission may occur in resources scheduled for ongoing eMBB traffic.

An eMBB UE may not ascertain whether PDSCH transmission of the corresponding UE has been partially punctured, and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1.

The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE may assume that there is no transmission to the UE in PRBs and symbols indicated by the DCI format 2_1 in a set of PRBs and a set of symbols in the last monitoring period before the monitoring period to which the DCI format 2_1 belongs.

For example, the UE assumes that a signal in a time-frequency resource indicated by the preemption is not a DL transmission scheduled for it and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. Regarding mMTC technology, 3GPP deals with MTC and NB (NarrowBand)—IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and, for repetitive transmission, (RF) retuning from a first frequency resource to a second frequency resource is performed in a guard period, and the specific information and the response to the specific information may be transmitted/received through a narrowband (e.g., 6 resource blocks (RBs) or 1 RB).

F. Basic Operation of AI Using 5G Communication

Figure 3:
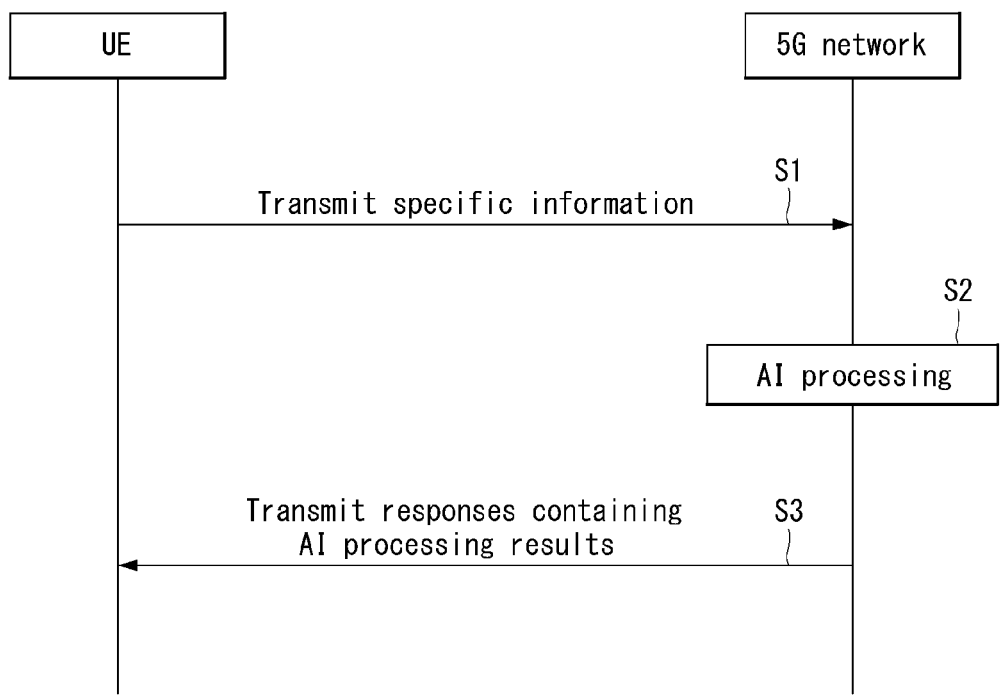
FIG. 3 shows an example of basic operations of a 5G network and user equipment in a 5G communication system.

FIG. 3 shows an example of basic operations of a 5G network and user equipment in a 5G communication system.

The UE transmits specific information to the 5G network (S1). The 5G network performs AI processing for the specific information (S2). In addition, the 5G network transmits responses containing AI processing results to the UE (S3).

G. Applied Operations Between UE and 5G Network in 5G Communication System

Hereinafter, an AI operation using 5G communication will be described in more detail with reference to FIGS. 1 and 2 and the above-described wireless communication technology (BM procedure, URLLC, mMTC, etc.).

First, a basic procedure of an applied operation to which a method proposed in the present disclosure to be described later and eMBB of 5G communication are applied will be described.

As in steps S1 and S3 of FIG. 3, the UE performs an initial access procedure and a random access procedure with the 5G network prior to step S1 of FIG. 3 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information.

Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, a response including AI processing results on the basis of the DL grant.

Next, a basic procedure of an applied operation to which a method proposed in the present disclosure to be described later and URLLC of 5G communication are applied will be described.

As described above, a UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE.

The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed in the present disclosure to be described later and URLLC of 5G communication are applied will be described.

The description will focus on changes and alterations made to the steps of FIG. 3 by the application of mMTC.

In step S1 of FIG. 3, the UE receives a UL grant from the 5G network in order to transmit specific information to the 5G network. Here, the UL grant may include information on the number of repetitions of transmission of the specific information, and the specific information may be repeatedly transmitted on the basis of the information on the number of repetitions.

That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be applied in combination with the methods proposed in the present disclosure to be described later, or may be used as a supplement to embody or clarify the methods proposed in the present disclosure.

H. AI Refrigerator

Figure 4:
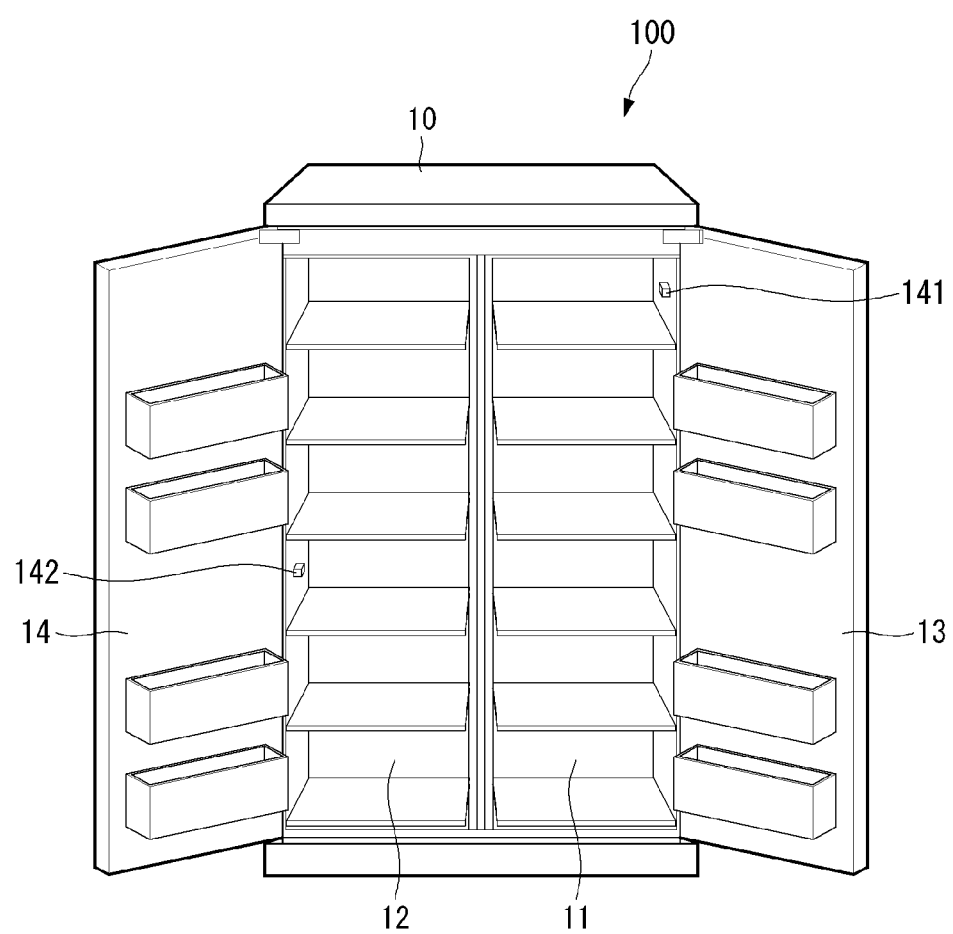
FIG. 4 is a diagram showing an example of an artificial intelligent refrigerator according to the present disclosure.

FIG. 4 is a diagram showing an example of an artificial intelligent refrigerator according to the present disclosure. The artificial intelligent refrigerator 100 according to an exemplary embodiment of the present disclosure illustrated in FIG. 4 may be configured to comprise an AI processor or AI module, in which case it may be referred to as a single AI device.

Moreover, the artificial intelligent refrigerator 100 according to an exemplary embodiment of the present disclosure may be configured not to comprise an AI processor or AI module but to perform data communicate with an AI device. In this case, the artificial intelligent refrigerator 100 has no built-in AI processor or AI module but instead may have artificial intelligence learning capabilities through data communication with the AI device. Thus, in this case, the artificial intelligence refrigerator 100 may be included in the AI device. Accordingly, in the present disclosure, the artificial intelligence refrigerator 100 also may be referred to as an AI device.

Referring to FIG. 4, the artificial intelligent refrigerator 100 according to an exemplary embodiment of the present disclosure may comprise a refrigerator body 10 having a refrigeration compartment and a freezer compartment 12, and a refrigeration compartment door 13 and freezer compartment door 14 for opening and closing the refrigeration compartment 11 and freezer compartment 12 of the refrigerator body 10. The artificial intelligent refrigerator 100 may have a refrigeration compartment temperature sensor 141 for sensing the temperature in the refrigeration compartment 11 and a freezer compartment temperature sensor 142 for sensing the temperature in the freezer compartment 12.

A plurality of refrigeration compartment temperature sensors 141 may be disposed within the refrigeration compartment 11. The refrigeration compartment temperature sensors 141 may be spaced apart from one another. The refrigeration compartment temperature sensors 141 may be referred to as first temperature sensors 141.

A plurality of freezer compartment temperature sensors 142 may be disposed within the freezer compartment 12. The freezer compartment temperature sensors 142 may be spaced apart from one another. The freezer compartment temperature sensors 142 may be referred to as second temperature sensors 142.

Figure 5:
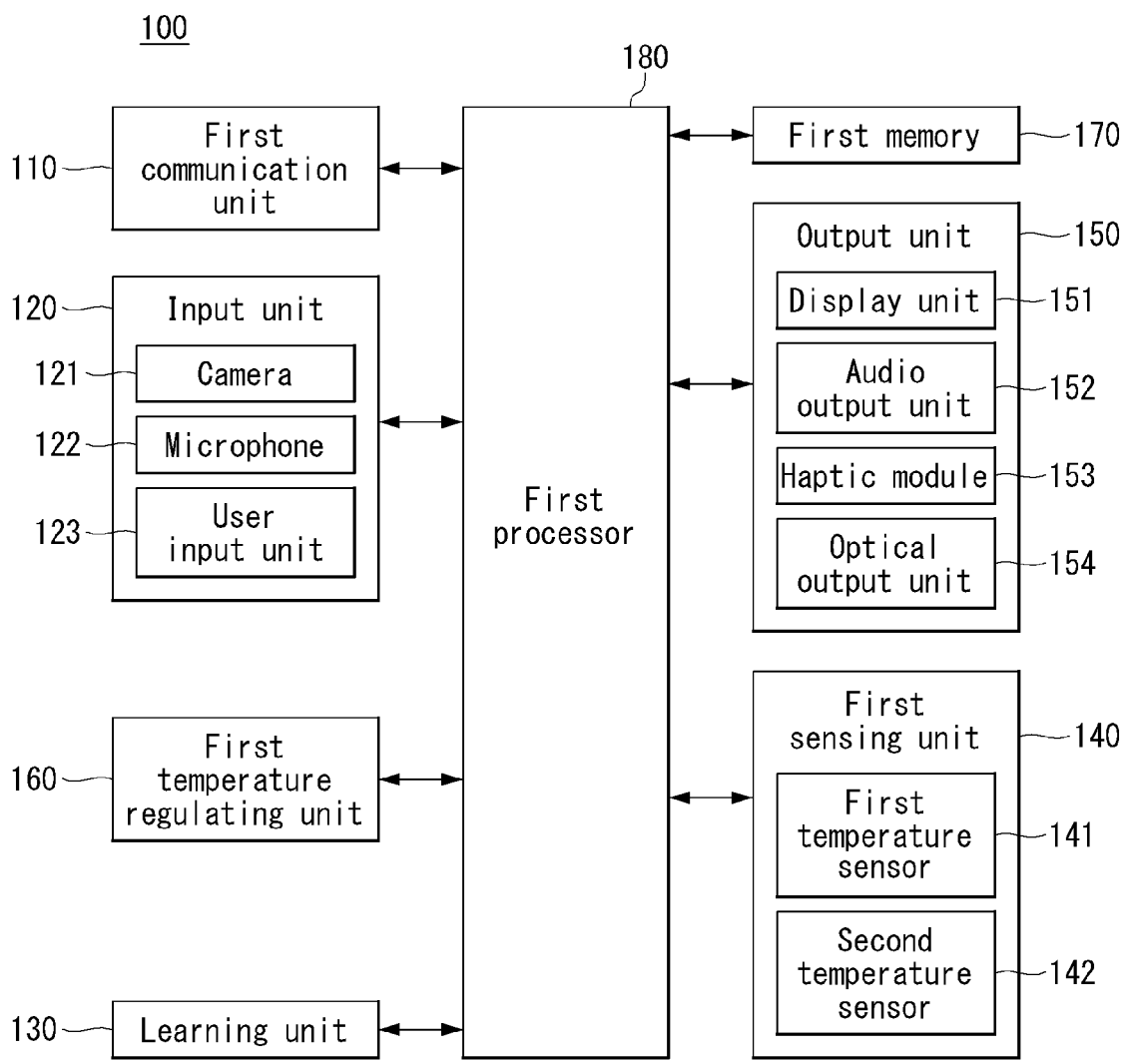
FIG. 5 is a block diagram showing components of an artificial intelligent refrigerator according to an exemplary embodiment of the present disclosure.

FIG. 5 is a block diagram showing components of an artificial intelligent refrigerator according to an exemplary embodiment of the present disclosure. Referring to FIG. 5, the artificial intelligent refrigerator 100 according to an exemplary embodiment of the present disclosure may comprise a first communication unit 110, an input unit 120, a learning unit 130, a first sensing unit 140, an output unit 150, a first temperature regulating unit 160, a first memory 170, and a first processor 180.

Firstly, the refrigeration compartment temperature sensors 141 and freezer compartment temperature sensors 142 described above may be included in the first sensing unit 140.

Moreover, the first processor 180 may be electrically connected to the refrigeration compartment temperature sensors 141 and the freezer compartment temperature sensors 142 and recognize temperature changes inside the refrigeration compartment 11 and freezer compartment 12. Meanwhile, when the first processor 180 recognizes temperature changes inside the refrigeration compartment 11 and freezer compartment 12, it sends a control command to the first temperature regulating unit 160. The first temperature regulating unit 160 then regulates the temperatures inside the refrigeration compartment 11 and freezer compartment 12 to maintain them at user-set temperatures.

Accordingly, the first temperature regulating unit 160 may further comprise a compression apparatus for compressing refrigerant and air. Further, it may comprise a fan to allow air circulation inside the refrigeration compartment 11 and freezer compartment 12.

The first communication unit 110 may send and receive data to and from external devices such as user equipment, a server, and other AI devices by using wired and wireless communication technologies. For instance, the first communication unit 110 may send and receive sensor information, a user input, a learning model, a control signal, and the like to and from external devices.

Meanwhile, the first communication unit 110 may send and receive data to and from the input unit 120, first temperature regulating unit 160, first sensing unit 140, output unit 150, first memory 170, and first processor 180 which are various components internal to the artificial intelligent refrigerator 100.

The communication technology used by the first communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data. The input unit 120 may include a camera 121 for video signal input, a microphone 122 for audio signal input, and a user input unit 123 for receiving information from the user. The camera or the microphone may be treated as a sensor, and a signal acquired from the camera or the microphone may be referred to as sensing data or sensor information.

The input unit 120 may acquire and learn input data to be used when obtaining an output, by using learning data for machine learning and a learning model. The input unit 120 may acquire raw input data. In this case, the first processor 180 or the learning processor 130 may extract an input feature by preprocessing the input data.

The input unit 120 may include a camera 121 for video signal input, a microphone 122 for audio signal input, and a user input unit 123 for receiving information from a user.

Audio data or image data collected by the input unit 120 may be analyzed and processed as a control command from the user.

The input unit 120 receives video information (or signal), audio information (or signal), data, or information received from the user, and the input unit 120 may comprise one or a plurality of cameras 121 for video information input.

The camera 121 processes an image frame such as a still image or moving image obtained by an image sensor in a video call mode or an image capture mode. The processed image frame may be displayed on a display unit 151 or stored in the first memory 170.

The microphone 122 processes external acoustic signals into electrical sound data. The processed sound data may be variously utilized according to the function (or the application program) performed in the refrigerator 100. Meanwhile, various noise removal algorithms for removing noise generated in a process of receiving the external acoustic signal is applicable to the microphone 122.

The user input unit 123 receives information from the user. When information is received through the user input unit 123, the processor 180 may control the operation of the refrigerator 100 to correspond to the input information.

The user input unit 123 may include a mechanical input means (or mechanical key, e.g., a button located on the front/rear or side of the refrigerator 100, a dome switch, a jog wheel, a jog switch, etc.) and a touch input means. As an example, the touch input means may include a virtual key, soft key, or visual key displayed on a touchscreen through software processing, or a touch key disposed at a portion other than the touchscreen.

Figure 6:
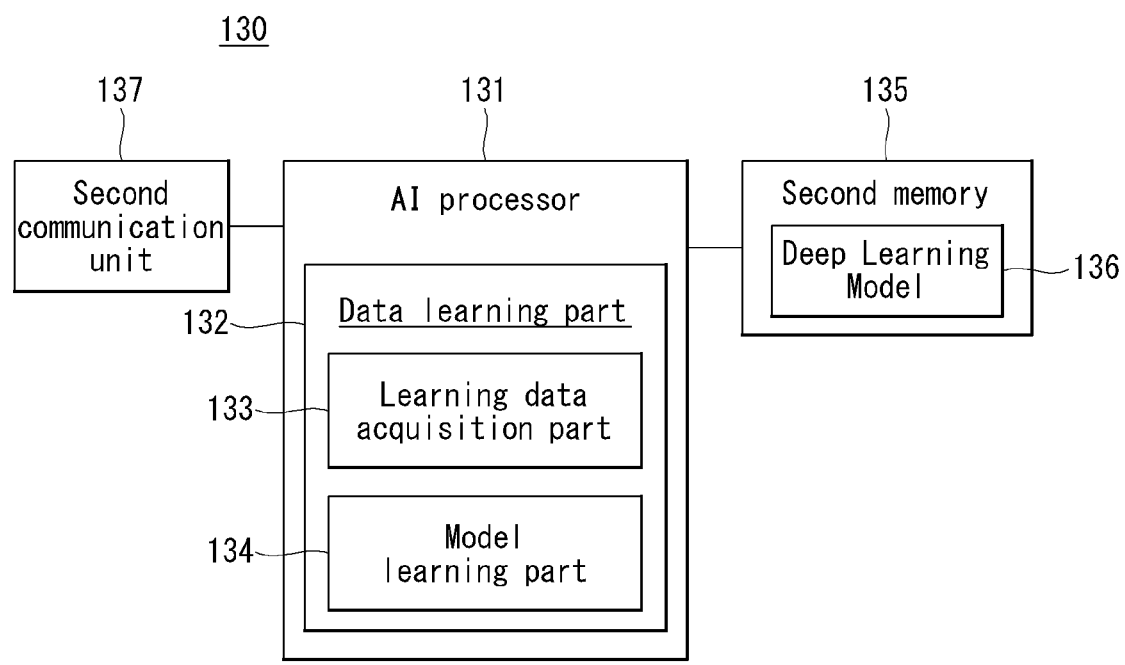
FIG. 6 is a block diagram showing a learning unit according to an exemplary embodiment of the present disclosure.

Referring to FIG. 6, the learning unit 130 according to this exemplary embodiment will be described in details. FIG. 6 is a block diagram showing a learning unit according to an exemplary embodiment of the present disclosure.

Referring to FIG. 6, the learning unit 130 according to this exemplary embodiment may comprise, but not limited to, an AI module or an AI processor. The learning unit 130 according to this exemplary embodiment may be composed of an AI module or AI processor itself. However, the following description will be given with an example in which the learning unit 130 according to this exemplary embodiment comprises an AI processor 131.

Moreover, the learning unit 130 may create an artificial neural network by using learning data. The learning data constituting the artificial neural network may be called a model. Also, the learning unit 130 may learn the model. The learned model may be referred to as a learning model.

The learning model may be used to infer result values for new input data, not of the learning data, and the inferred values may be used as a basis for making decisions required when the artificial intelligent refrigerator 100 performs a certain operation.

Accordingly, the learning unit 130 may comprise an AI processor 131 capable of performing operations to train an artificial neural network, and a second memory 135 for storing a learned model. The learning unit 130 may further comprise a second communication unit 137.

The AI processor 131 may perform data communication directly with other components included in the artificial intelligent refrigerator 100 and/or external devices through the second communication unit 137, and store learning data and a learning model in the second memory 135.

Meanwhile, the learning model may be implemented in hardware, software, or a combination of hardware and software. If all or part of the learning model is implemented in software, one or more instructions that constitute the learning model may be stored in the second memory 135.

Meanwhile, the AI processor 131 may train a neural network by using a program stored in the second memory 135. Particularly, the AI processor 131 may train a neural network for recognizing device-related data.

Here, the device-related data comprises data related to the artificial intelligent refrigerator 100. Also, the device-related data comprises data related to external devices capable of performing data communication with the artificial intelligent refrigerator 100, apart from the artificial intelligent refrigerator 100.

The neural network for recognizing device-related data may be designed to emulate a human brain's structure on a computer, and may comprise a plurality of network nodes having weights that emulate neurons in a human neural network.

The plurality of network nodes may send and receive data through connections so that they emulate the synaptic activity of neurons sending and receiving signals through synapses. Here, the neural network may comprise a deep learning model, which evolved from a neural network model.

In the deep learning model, the plurality of network nodes are arranged in different layers, and may send and receive data through convolutions.

Examples of the neural network model include various deep learning techniques such as deep neural networks (DNN), convolutional deep neural networks (CNN), recurrent neural networks (RNN), restricted Boltzmann machines (RBM), deep belief networks (DBN), and deep Q-networks, and are applicable to fields including computer vision, speech recognition, natural language processing, and speech/signal processing.

Meanwhile, a processor that performs the above-described functions may be a general-purpose processor (e.g., CPU) or an AI-dedicated processor (e.g., GPU) for artificial intelligence learning.

The second memory 135 may store various programs and data required for the operation of the learning unit 130. The second memory 135 may be implemented as non-volatile memory, volatile memory, flash memory, hard disk drive (HDD), or solid state drive (SSD).

The second memory 135 is accessed by the AI processor 31, and the AI processor 131 may read, write, modify, delete, or update data. Also, the second memory 135 may store a neural network model (e.g., deep learning model 136) created by a learning algorithm for data classification/recognition according to an exemplary embodiment of the present disclosure.

Meanwhile, the AI processor 131 may further comprise a data learning part 132 for training a neural network for data classification/recognition. The data learning part 132 may learn criteria about which learning data it will use to determine on data classification/recognition and how data is classified and recognized using learning data.

The data learning part 132 may train a deep learning model by acquiring learning data to be used in learning and applying the acquired learning data to the deep learning model.

The data learning part 132 may be manufactured in the form of at least one hardware chip and mounted on the learning unit 130. For example, the data learning part 132 may be manufactured in the form of a hardware chip dedicated to artificial intelligence (AI), or may be manufactured as part of a general-purpose processor (CPU) or dedicated graphics processor (GPU) and mounted on the learning unit 130.

Also, the data learning part 132 may be implemented as a software module. If it is implemented as a software module (or a program module including instructions), the software module may be stored in a non-transitory computer readable medium. In this case, at least one software module may be provided by an OS (operating system) or by an application.

The data learning part 132 may comprise a learning data acquisition part 133 and a model training part 134.

The learning data acquisition part 133 may acquire learning data required for a neural network model for classifying and recognizing data. For example, the learning data acquisition part 133 may acquire learning data such as vehicle data and/or sample data to be fed into the neural network model.

By using the acquired learning data, the model training part 134 may train the neural network model to have criteria for deciding how to classify certain data.

In this instance, the model training part 134 may train the neural network model through supervised learning which uses at least part of the learning data as the criteria for decision-making.

Alternatively, the model training part 134 may train the neural network model through unsupervised learning which helps find criteria for decision-making by allowing the neural network model to learn on its own without supervision using the learning data. Also, the model training part 134 may train the neural network model through reinforcement learning by using feedback about whether a right decision is made on a situation by learning.

Also, the model training part 134 may train the neural network model by using a learning algorithm including error back-propagation or gradient descent.

Once the neural network model is trained, the model training part 134 may store the trained neural network model in memory. The model training part 134 may store the trained neural network model in a memory of a server connected to the learning unit 130 over a wired or wireless network.

The data learning part 132 may further comprise a learning data pre-processing part (not shown) and a learning data selection part (not shown), in order to improve analysis results from a recognition model or save the resources or time needed to create the recognition model.

The learning data pre-processing part may pre-process acquired data so that the acquired data is used in learning to decide on situations. For example, the learning data pre-processing part may process acquired learning data into a preset format to enable the model training part 134 to use the acquired data in learning to recognize images.

Moreover, the learning data selection part may select data required for learning from among the learning data acquired by the learning data acquisition part 133 or the learning data pre-processed by the pre-processing part. The selected learning data may be provided to the model training part 134.

For example, the learning data selection part may detect a specific segment from an image acquired by a camera in the vehicle so as to select only data about objects included in the specific segment as learning data.

In addition, the data learning part 132 may further comprise a model evaluation part (not shown) for improving analysis results from the neural network model.

The model evaluation part may feed evaluation data into the neural network model, and, if analysis results produced from the evaluation data do not satisfy a predetermined criterion, may get the model training part 134 to train the neural network model again. In this case, the evaluation data may be data that is defined for evaluating the recognition model.

In an example, if the number or proportion of evaluation data from which inaccurate analysis results are produced by analyzing the recognition model trained on the evaluation data exceeds a preset threshold, the model evaluation part may evaluate the analysis results as not satisfying the predetermined criterion.

Meanwhile, referring again to FIG. 5, the first sensing unit 140 may obtain at least one among information on the inside of the artificial intelligent refrigerator 100, information on the surrounding environment, and information on the user by using various sensors.

In this case, the sensors included in the first sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, lidar, radar, etc.

Referring to FIG. 5, the output unit 150 may comprise at least one among the display unit 151, a sound output unit 152, a haptic module 153, and an optical output unit 154.

The display unit 151 displays (outputs) information processed by the artificial intelligent refrigerator 100. For example, the display unit 151 may display execution screen information of an application program running on the artificial intelligent refrigerator 100 or user interface (UI) and graphic user interface (GUI) information according to such execution screen information.

The display unit 151 may implement a touchscreen by forming an interlayer with a touch sensor or by being integrated with it. This touch screen may function as a user input unit 123 that provides an input interface between the artificial intelligence refrigerator 100 and the user, and, at the same time, may provide an output interface between the artificial intelligence refrigerator 100 and the user.

The audio output unit 152 may output audio data that is received from the first communication unit 110 or stored in the memory 170 during call signal reception, a call mode, a recording mode, a voice recognition mode, a broadcast reception mode, etc.

The audio output unit 152 may comprise at least one among a receiver, a speaker, and a buzzer.

The haptic module 153 generates various tactile effects that a user can feel. A representative example of the tactile effect generated by the haptic module 153 may be vibration.

The optical output unit 154 outputs a signal for notifying the generation of an event by using light from a light source of the artificial intelligent refrigerator 100. Examples of events generated in the artificial intelligent refrigerator 100 may include message reception, call signal reception, a missed call, an alarm, schedule notification, email reception, information reception through an application, and the like.

Hereinafter, an AI system comprising the artificial intelligent refrigerator 100 according to an exemplary embodiment of the present disclosure will be described with reference to FIG. 7.

Figure 7:
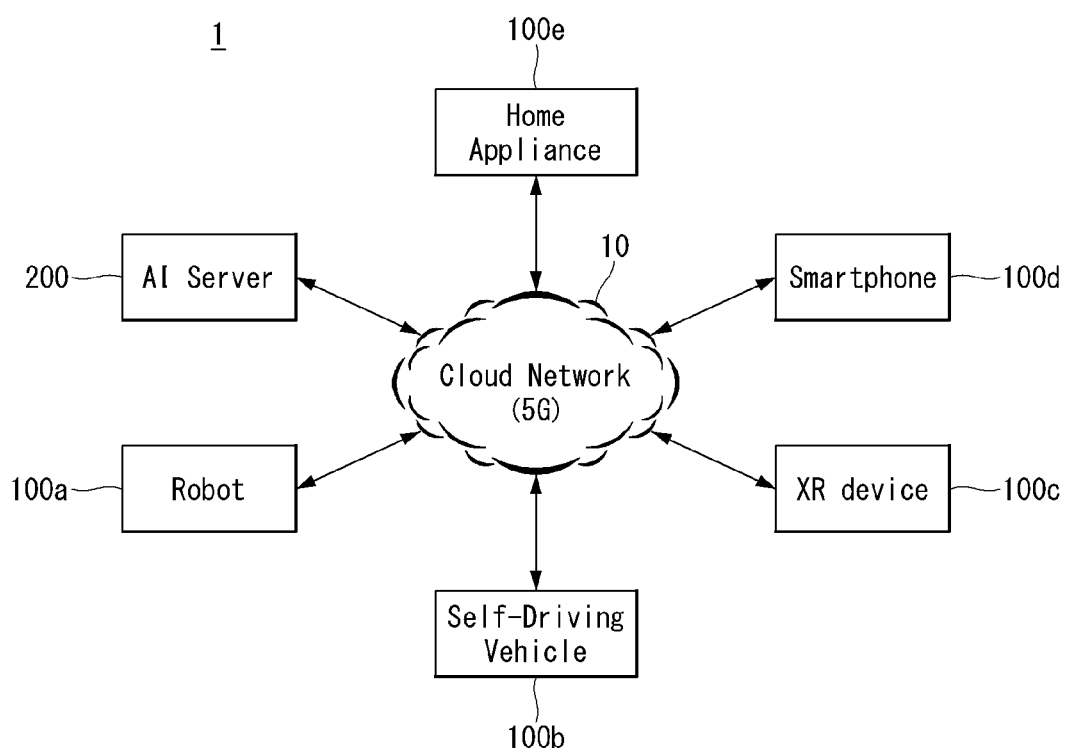
FIG. 7 is a conceptual diagram showing an AI system according to an exemplary embodiment of the present disclosure.

FIG. 7 is a conceptual diagram showing an AI system according to an exemplary embodiment of the present disclosure.

The AI system 1 according to an exemplary embodiment of the present disclosure may use an AI server 200 in order to control at least one artificial intelligent refrigerator 100. Also, each artificial intelligent refrigerator 100 may perform data communication with the AI server 200. The data communication between them may be performed according to 5G network standards as described above.

Moreover, the AI system 1 explained with reference to FIG. 7 is only one of a number of embodiments of the present disclosure, so the present disclosure is not limited by this explanation.

Meanwhile, referring to FIG. 7, the AI system 1 according to this exemplary embodiment comprises an AI server 200, at least one robot 100*a*, a self-driving vehicle 100*b*, an XR device 100*c*, a smartphone 100*d*, and/or a home appliance 100*e*. The artificial intelligent refrigerator 100 according to an exemplary embodiment of the present disclosure may be included as a type of home appliance 100*e*.

Moreover, the AI system 1 according to this exemplary embodiment is connected to the AI server 200, the robot 100*a*, the self-driving vehicle 100*b*, the XR device 100*c*, the smartphone 100*d*, and/or the home appliance 100*e* over the cloud network 10, and the cloud network 10 may refer to a network that forms part of a cloud computing infrastructure and/or resides in the cloud computing infrastructure.

The cloud network 10 may be configured using a 3G network, a 4G or LTE (Long Term Evolution) network, and/or a 5G network.

Apart from the AI server 200, the robot 100*a*, self-driving vehicle 100*b*, XR device 100*c*, smartphone 100*d*, and/or home appliance 100*e* may be altogether referred to as AI devices 100*a* through 100*e* since the AI technology is applicable to all of them.

It should be noted that the respective devices are denoted by their own names as shown in FIG. 7, in order to provide an intuitive understanding of the functions of the respective devices.

The respective devices 100*a* through 100*e* and 200 constituting the AI system 1 are connected together through the cloud network 10, and therefore may communicate with one another through a base station or directly without a base station.

The AI server 200 may comprise a server that performs AI processing and a server that performs operations on big data.

The AI server 200 may be connected to at least one among the robot 100*a*, the self-driving vehicle 100*b*, the XR device 100*c*, the smartphone 100*d*, and the home appliance 100*e* through the cloud network 10, and may assist at least part of the AI processing of the connected AI devices 100*a* through 100*e*.

Here, the AI server 200*a* may train an artificial neural network according to a machine learning algorithm in place of the AI devices 100*a* to 100*e* and directly store a learning model or transmit the learning model to the AI devices 100*a* through 100*e*.

Moreover, the AI server 200 may receive input data from the AI devices 100*a* through 100*e*, infer result values for the received input data by using a learning model, generate a response or control command based on the inferred result values, and transmit it to the AI devices 100*a* through 100*e*.

Alternatively, the AI devices 100*a* through 100*e* may infer result values for input data directly by using a learning model and generate a response or control based on the inferred result values.

Hereinafter, several exemplary embodiments of the AI system 1 will be described.

<AI+Robot>

The robot 100*a* may be implemented as a guidance robot, a transportation robot, a cleaning robot, a wearable robot, an entertainment robot, a pet robot, an unmanned aerial robot, etc., to which the AI technology is applied.

The robot 100*a* may comprise a robot control module for controlling tasks. The robot control module may mean a software module or a chip in which a software module is implemented using hardware.

The robot 100*a* may obtain status information of the robot 100*a*, detect (recognize) a surrounding environment and objects, create map data, determine its movement path and travel plan, determine a response to a user interaction, or determine a task, by using sensor information obtained from various kinds of sensors.

Here, the robot 100*a* may use sensor information obtained from at least one sensor among lidar, radar, and a camera, in order to determine its movement path and travel plan.

The robot 100*a* may perform the above tasks by using a learning model consisting of at least one artificial neural network. For example, the robot 100*a* may recognize a surrounding environment and objects by using a learning model, and determine a task by using information on the recognized surrounding environment information or objects. Here, the learning model may be trained directly on the robot 100*a*, or may be trained on an external device, such as the AI server 200.

The robot 100*a* may perform a task by generating results directly by using the learning model, or may perform a task by transmitting sensor information to an external device, such as the AI server 200, and receiving results generated from it.

The robot 100*a* may determine its movement path and travel plan by using at least one among map data, object information detected from sensor information, and object information obtained from an external device. The robot 100*a* may travel according to the determined movement path and travel plan by controlling the driving unit.

The map data may include object identification information for various objects disposed in a space in which the robot 100*a* moves. For example, the map data may include object identification information for fixed objects, such as walls and doors, and movable objects, such as flowerpots and desks. Moreover, the object identification information may include name, type, distance, location, etc.

Moreover, the robot 100*a* may perform a task or travel by controlling the driving unit based on the user's control/interaction. At this point, the robot 100*a* may obtain information on the intent of the interaction according to the user's motion or speech utterance and perform a task by determining a response based on the obtained intention information.

<AI+Autonomous Driving>

The self-driving vehicle 100*b* may be implemented as a mobile robot, a vehicle, an unmanned aerial vehicle, etc., to which the AI technology is applied.

The self-driving vehicle 100*b* may comprise an autonomous driving control module for controlling the autonomous driving function, and the autonomous driving control module may mean a software module or a chip that implements the software module in hardware. The autonomous driving control module may be internally included as a component of the autonomous driving vehicle 100*b*, or may be configured as a separate piece of hardware and connected to the outside of the autonomous driving vehicle 100*b*.

The self-driving vehicle 100*b* may obtain status information of the self-driving vehicle 100*b* by using sensor information obtained from various types of sensors, detect (recognize) a surrounding environment and objects, generate map data, determine its movement path and travel plan, or determine an operation.

Like the robot 100*a*, the self-driving vehicle 100*b* may use sensor information obtained by at least one sensor among lidar, radar, and a camera, in order to determine its movement path and travel plan.

In particular, the self-driving vehicle 100b may recognize an environment or object in an area hidden from view or an area extending a certain distance or longer by receiving sensor information from external devices, or may receive recognized information directly from external devices.

The self-driving vehicle 100b may perform the above tasks by using a learning model consisting of at least one artificial neural network. For example, the self-driving vehicle 100b may recognize a surrounding environment and objects by using a learning model, and determine the course of travel by using the recognized surrounding environment information or object information. Here, the learning model may be trained directly on the self-driving vehicle 100b, or may be trained on an external device, such as the AI server 200.

The self-driving vehicle 100b may perform a task by generating results directly by using the learning model, or may perform a task by transmitting sensor information to an external device, such as the AI server 200, and receiving results generated from it.

The self-driving vehicle 100b may determine its movement path and travel plan by using at least one among map data, object information detected from sensor information, and object information obtained from an external device. The self-driving vehicle 100b may travel according to the determined movement path and travel plan by controlling the driving unit.

The map data may include object identification information for various objects disposed in a space (e.g., road) in which the self-driving vehicle 100b travels. For example, the map data may include object identification information for fixed objects, such as streetlights, rocks, and buildings, and movable objects, such as vehicles and pedestrians. Moreover, the object identification information may include name, type, distance, location, etc.

Moreover, the self-driving vehicle 100b may perform a task or travel by controlling the driving unit based on the user's control/interaction. In this case, the self-driving vehicle 100b may obtain information about the intent of the interaction via the user's motion or speech utterance and determine a response based on the obtained intention information and perform the task.

<AI+XR>

The XR device 100c may be implemented as a HUD (head-up display), television, a mobile phone, a smartphone, a computer, a wearable device, a home appliance, a digital signage, a vehicle, a stationary robot, or a mobile robot, to which the AI technology is applied.

The XR device 100c may obtain information on a surrounding space or real-world object by analyzing three-dimensional point cloud data or image data obtained through various sensors or from an external device and creating location data and attribute data for three-dimensional points, and may render and output an XR object. For example, the XR device 100c may output an XR object containing additional information on a recognized object by matching it to the recognized object.

The XR device 100c may perform the above tasks by using a learning model consisting of at least one artificial neural network. For instance, the XR device 100c may recognize a real-world object from three-dimensional point cloud data or image data by using a learning model, and provide information corresponding to the recognized real-world object. Here, the learning model may be trained directly on the XR device 100c or trained on an external device such as the AI server 200.

The XR device 100c may perform a task by generating results directly by using the learning model, or may perform a task by transmitting sensor information to an external device, such as the AI server 200, and receiving results generated from it.

<AI+Robot+Autonomous Driving>

The robot 100a may be implemented as a guidance robot, a transportation robot, a cleaning robot, a wearable robot, an entertainment robot, a pet robot, or an unmanned aerial robot, to which the AI technology and the autonomous driving technology are applied.

The robot 100a to which the AI technology and the autonomous driving technology are applied may mean a robot with autonomous driving functionality or a robot 100a that interacts with a self-driving vehicle 100b.

The robot 100a with autonomous driving functionality may collectively refer to devices that move on their own along a given route without user control or move along a route determined by themselves.

The robot 100a with autonomous driving functionality and the self-driving vehicle 100b may use a common sensing method to determine one or more between a movement path and a travel plan. For example, the robot 100a with autonomous driving functionality and the self-driving vehicle 100b may determine one or more between a movement path and a travel plan by using information sensed by lidar, radar, and a camera.

The robot 100a interacting with the self-driving vehicle 100b may exist separately from the self-driving vehicle 100b and, at the same time, may be associated with the autonomous driving function inside the self-driving vehicle 100b, or may perform a task associated with a user riding in the self-driving vehicle 100b.

In this case, the robot 100a interacting with the self-driving vehicle 100b may acquire sensor information in place of the self-driving vehicle 100b and provide it to the self-driving vehicle 100b, or may acquire sensor information, create information on the surrounding environment or objects, and provide it to the self-driving vehicle 100b, thereby controlling or assisting the autonomous driving function of the self-driving vehicle 100b.

Alternatively, the robot 100a, while interacting with the self-driving vehicle 100b, may control the functions of the self-driving vehicle 100b by monitoring a user riding in the self-driving vehicle 100b or interacting with the user.

For instance, if the driver is deemed dozing off, the robot 100a may enable the autonomous driving function of the self-driving vehicle 100b or assist in controlling the driving unit of the self-driving vehicle 100b.

Here, the functions of the self-driving vehicle 100b controlled by the robot 100a may include functions provided by a navigation system or audio system provided inside the self-driving vehicle 100b, as well as the autonomous driving function.

Alternatively, the robot 100a outside the self-driving vehicle 100b, which is interacting with the self-driving vehicle 100b, may provide information to the self-driving vehicle 100b or assist the functions of the self-driving vehicle 100b.

For instance, the robot 100a may provide traffic information including signaling information to the self-driving vehicle 100b, like smart traffic lights do, or may automatically connect an electricity charger to a socket by interacting with the self-driving vehicle 100b, like an automatic electricity charger of an electric vehicle does.

<AI+Robot+XR>

The robot 100*a* may be implemented as a guidance robot, a transportation robot, a cleaning robot, a wearable robot, an entertainment robot, a pet robot, an unmanned aerial robot, or a drone, to which the AI technology and the XR technology are applied.

The robot 100*a* to which the XR technology is applied may mean a robot that is controlled and interacted with within an XR image. In this case, the robot 100*a* is distinct from the XR device 100*c*, and may interface with it.

Once the robot 100*a* that is controlled and interacted with within an XR image obtains sensor information from sensors including a camera, the robot 100*a* or XR device 100*c* may generate an XR image based on the sensor information, and the XR device 100*c* may output the generated XR image. Also, such a robot 100*a* may operate based on a control signal fed through the XR device 100*c* or based on user interaction.

For example, the user may see an XR image from the point of view of a remotely connected robot 100*a* through an external device such as the XR device 100*c*, and may adjust the robot 100*a*'s autonomous driving route via interaction, control tasks or driving, and see information on surrounding objects.

<AI+Autonomous Driving+XR>

The self-driving vehicle 100*b* may be implemented as a mobile robot, a vehicle, or an unmanned aerial vehicle, to which the AI technology and the XR technology are applied.

The self-driving vehicle 100*b* to which the XR technology is applied may mean a self-driving vehicle equipped with a means for providing an XR image or a self-driving vehicle that is controlled and interacted with within an XR image. Particularly, the self-driving vehicle 100*b* that is controlled and interacted with within an XR image is distinct from the XR device 100*c*, and may interface with it.

The self-driving vehicle 100*b* equipped with a means for providing an XR image may obtain sensor information from sensors including a camera, and output a generated XR image based on the obtained sensor information. For instance, the self-driving vehicle 100*b* may provide an XR object corresponding to a real-world object or on-screen object to a passenger by having an HUD and outputting an XR image on it.

In this instance, when an XR object is outputted on the HUD, at least part of the XR object may overlap a real object where the passenger's gaze is directed. On the other hand, when an XR object is outputted on a display provided inside the self-driving vehicle 100*b*, at least part of the XR object may overlap an on-screen object.

For example, the self-driving vehicle 100*b* may output XR objects corresponding to objects such as driveways, other vehicles, traffic lights, traffic signs, two-wheel vehicles, pedestrians, buildings, etc.

Once the self-driving vehicle 100*b* that is controlled and interacted with within an XR image obtains sensor information from sensors including a camera, the self-driving vehicle 100*b* or XR device 100*c* may generate an XR image based on the sensor information, and the XR device 100*c* may output the generated XR image.

Also, such a self-driving vehicle 100*b* may operate based on a control signal fed through an external device such as the XR device 100*c* or based on user interaction.

Hereinafter, an artificial intelligent food refrigerating device according to an exemplary embodiment of the present disclosure will be described in concrete details with reference to FIGS. 8 to 12. In the above description, the description of the UE (user equipment) may apply to user equipment (UE) that controls the artificial intelligent food refrigerating device.

Figure 8:
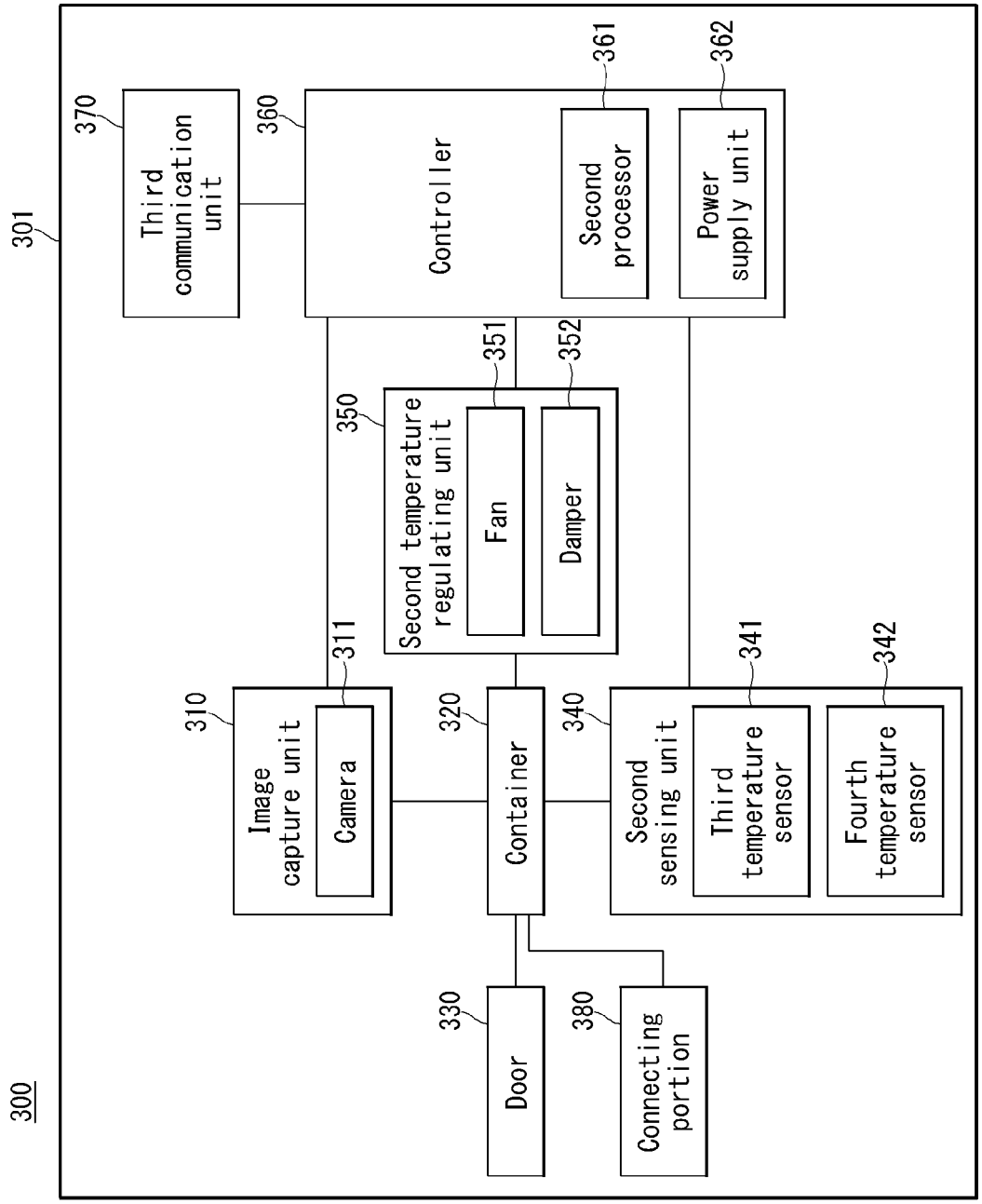
FIG. 8 is a block diagram showing a configuration of an artificial intelligent food refrigerating device according to an exemplary embodiment of the present disclosure.

FIG. 8 is a block diagram showing a configuration of an artificial intelligent food refrigerating device according to an exemplary embodiment of the present disclosure.

Referring to FIG. 8, the artificial intelligent food refrigerating device according to an exemplary embodiment of the present disclosure comprises a main body 301, an image capture unit 310, a container 320, a door 330, a second sensing unit 340, a second temperature regulating unit 350, a controller 360, a third communication unit 370, and a connecting portion 380.

The main body 301 forms the exterior of the artificial intelligent food refrigerating device 300 according to an exemplary embodiment of the present disclosure.

The container 320 is formed inside the main body 301 to hold food in it.

The door 330 is configured to open and close the container 320.

The image capture unit 310 is configured to capture food inside and outside the container 320. Also, the image capture unit 310 is configured to continuously capture food placed in the container 320.

Particularly, the image capture unit 310 is configured to capture food passing through the door 330, when capturing food outside the container 320. Besides, the image capture unit 310 is configured to capture food placed adjacent to the device 300, when capturing food placed outside the artificial intelligent food refrigerating device 300.

The image capture unit 310 generates a first image of food when capturing food outside the container 320 or food passing through the door 330.

The image capture unit 310 may further comprise a camera 311 for capturing food, and the camera 311 may further comprise an FLIR camera.

Hereinafter, the image capture unit 310 according to this exemplary embodiment will be described with an example in which it is configured as an FLIR camera. Also, the FLIR camera will be explained by using the same reference numeral as the camera.

The FLIR camera 311 generates a first image by capturing food before or at the moment when the food is put into the container 360. Also, the FLIR camera 311 transmits the first image to the controller 360 so that the controller 360 analyzes the first image.

The FLIR camera 311 generates a second image by continuously capturing the food placed inside the container 320. Also, the FLIR camera 311 transmits the second image to the controller 360 so that the controller 360 analyzes the second image.

The second sensing unit 340 is configured to measure status information of the inside of the container 320 and the outside of the artificial intelligent food refrigerating device 300. Here, the status information comprises environment information such as temperature and humidity.

To this end, the second sensing unit 340 may further comprise a third temperature sensor 341 and a fourth temperature sensor 342. In this case, the fourth temperature sensor 342 may be configured to measure the temperature and humidity of the inside of the container 320, and the third temperature sensor 341 may be configured to measure the temperature and humidity of the outside of the artificial intelligent food refrigerating device 300.

Furthermore, the third temperature sensor 341 may be configured to measure the temperature and humidity of a place where the artificial intelligent refrigerator 100 is placed.

The second temperature regulating unit 350 is configured to regulate at least one between the temperature and humidity inside the container 320.

To this end, the second temperature regulating unit 350 may comprise at least one between a fan 351 and a damper 352.

Figure 11:
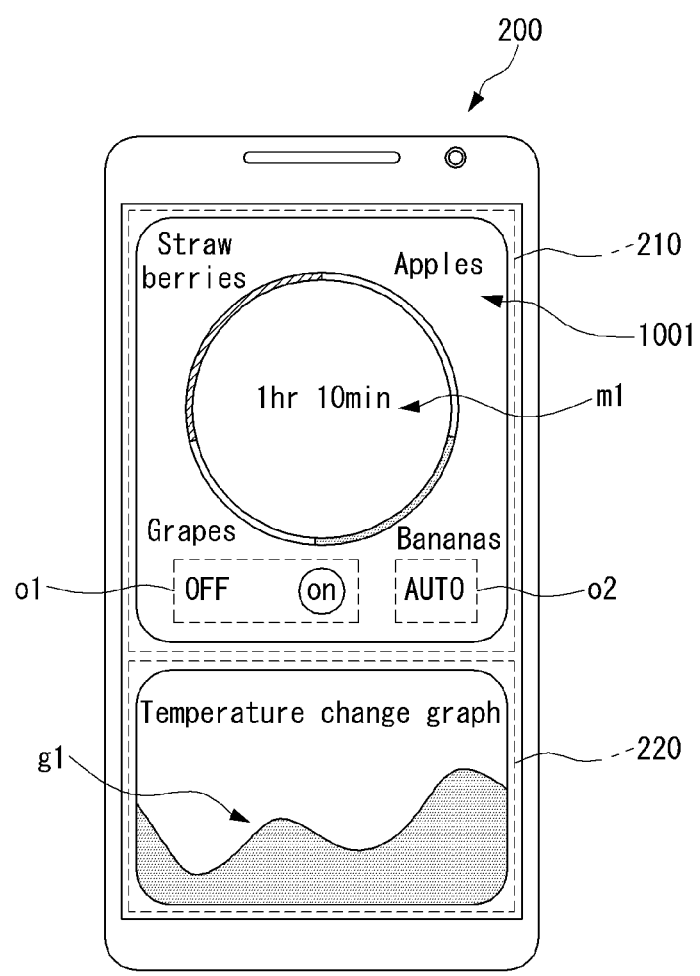
FIG. 11 is a diagram showing user equipment according to an exemplary embodiment of the present disclosure.

The controller 360 is configured to control the temperature inside the container 320 by at least one among the user equipment 200, artificial intelligent refrigerator 100, and device with AI functionality illustrated in FIG. 11.

FIG. 11 is a diagram showing user equipment according to an exemplary embodiment of the present disclosure.

To interface with the user equipment 200, the controller 360 may further comprise a second processor 361, which is a separate processing device from the processor included in the artificial intelligent refrigerator 100. Also, the controller 360 may further comprise a power supply unit 362 for supplying power to the components of the artificial intelligent food refrigerating device 300.

Particularly, the controller 360 collects and analyzes status information of the inside of the container 320, the food placed inside the container 320, and the food before it is put into the container 320 through the image capture unit 310 and the second sensing unit 340.

Accordingly, the controller 360 may determine the temperature of food before or at the moment when the food is put into the container 320 by analyzing the first image generated by the image capture unit 310. Also, the controller 360 may identify a change in the temperature of the food being stored in the container 320 by analyzing the second image generated by the image capture unit 310.

Moreover, the controller 360 collects and analyzes status information of the outside of the artificial intelligent food refrigerating device 300 through the image capture unit 310 and the second sensing unit 340. Accordingly, the controller 360 may determine the temperature and humidity of the surroundings of the artificial intelligent food refrigerating device 300 and the surroundings of the artificial intelligent refrigerator 100 through the image capture unit 310 and the second sensing unit 340.

In this way, the controller 360 controls the second temperature regulating unit 350 based on the status information collected of the inside and outside of the artificial intelligent food refrigerating device 300 so as to regulate the temperature inside the container 320.

Moreover, the controller 360 is configured to perform data communication with the artificial intelligent refrigerator 100, the user equipment 200, a device with AI functionality, and other artificial intelligent food refrigerating devices through the third communication unit 370.

As described above, the third communication unit 370 is configured such that the artificial intelligent food refrigerating device 300 or controller 360 performs data communication with the artificial intelligent refrigerator 100, the user equipment 200, a device with AI functionality, and other artificial intelligent food refrigerating devices.

The connecting portion 380 serves to connect the main body 301 to the refrigeration compartment 11 or freezer compartment 12 of the artificial intelligent refrigerator 100.

Figure 9:
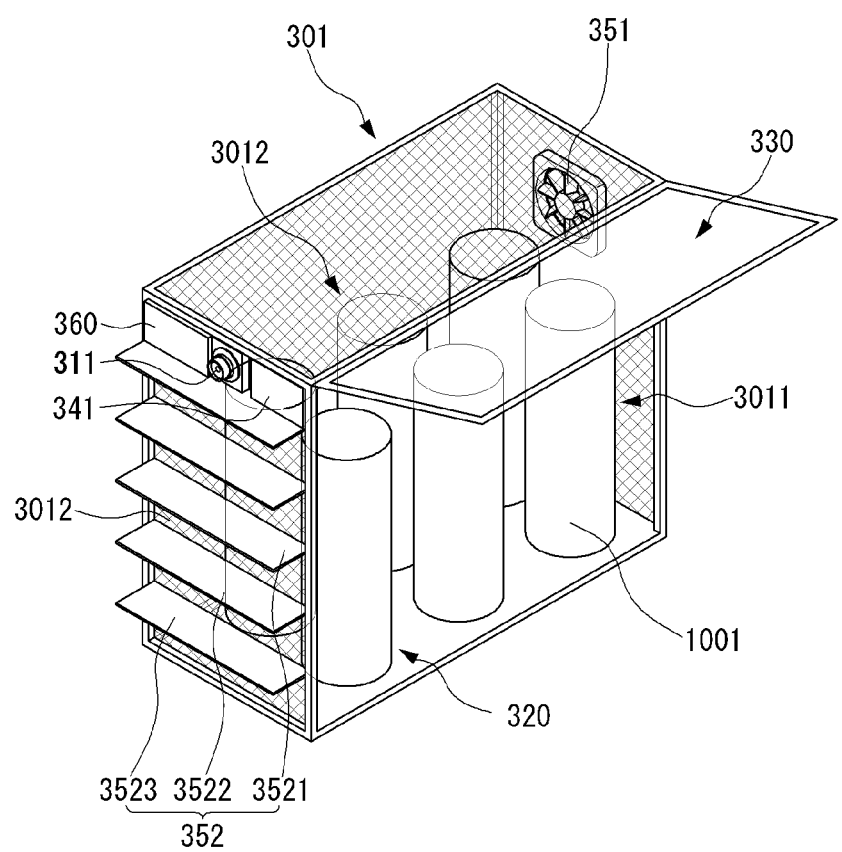
FIG. 9 is a perspective view of an artificial intelligent food refrigerating device according to an exemplary embodiment of the present disclosure.

Referring to FIG. 9, an example of the artificial intelligent food refrigerating device 300 according to this exemplary embodiment will be described in concrete details.

FIG. 9 is a perspective view of an artificial intelligent food refrigerating device according to an exemplary embodiment of the present disclosure.

The main body 301 may have a circular or hexagonal shape. However, the main body 301 according to the present disclosure is not limited to a circular or hexagonal shape but may have various shapes such as an octahedron and a hexadecahedron. However, the main body 301 according to this exemplary embodiment will be described with an example in which it has a hexagonal shape.

Moreover, since the main body 301 is formed in a hexagonal shape, the front of the main body 301 will be described as being formed as the door 330.

As illustrated by way of example in FIG. 9, the door 330 may be attached in such a manner that a portion of the door 330 can rotate on the main body 301. To this end, a hinge may be formed where the door 330 is attached to the main body 301.

However, the opening and closing of the door 330 is not limited to this, but also may be opened and closed in various existing well-known methods.

Meanwhile, the door 330 further comprises a function for sealing the container 320, as well as a function for opening and closing the container 320. Accordingly, when the user wants to put food 1001 into the container 320 or take the food 1001 out from the container 320, the container 320 is unsealed from the outside as soon as it is opened.

However, the door 330 is kept closed when food is to be refrigerated, in which case the door 330 seals the container 320 from the outside, thereby preventing cool air from leaking out of the container 320.

In addition, the door 330 may be configured as part of the main body 301 or separately from the main body 301.

Meanwhile, the artificial intelligent food refrigerating device 300 has a separate flow path set therein through which cool air is admitted into the container 320, since cool air needs to be admitted into the container 320 in order to refrigerate the food 1001 being stored in the container 320.

For example, in this exemplary embodiment, even if the door 330 is closed, cool air generated from the artificial intelligent refrigerator 100 may enter the container 320 through a mesh structure formed on a left side 3011 of the main body 301.

Also, the connecting portion 380 may be formed integrally with the main body 301 because the main body 301 can be attached to the inside of the refrigeration compartment 11 or freezer compartment 12 of the artificial intelligent refrigerator 100 by means of the connecting portion 380. However, if necessary, the connecting portion 380 may not be formed integrally with the main body 301.

The connecting portion 380 allows the main body 301 to be disposed adjacent to a cool air outlet formed inside the refrigeration compartment 11 or freezer compartment 12. Accordingly, the connecting portion 380 may be configured in such a manner as to be connected to the cool air outlet formed inside the refrigeration compartment 11 or freezer compartment 12 or be connected to the surroundings of the cool air outlet.

Moreover, the connecting portion 380 allows for removal of the main body 301 from the refrigeration compartment 11 or freezer compartment 12. Accordingly, if necessary, the user may have the main body 301 removed from the refrigeration compartment 11 or freezer compartment 12, and have the main body 301 mounted on the refrigeration compartment 11 and freezer compartment 12 by turns.

Preferably, the connecting portion 380 is formed on one side of the main body 301 to make the main body 301 easily attach to or detach from the refrigeration compartment 11 or freezer compartment 12. Also, it is preferable that the connecting portion 380 be configured to face the outside of the main body 301.

Additionally, a fastening portion (not shown) to be fastened to the connecting portion 380 may be formed inside the refrigeration compartment 11 or freezer compartment 12 of the artificial intelligent refrigerator 100, or may be configured separately. Such a fastening portion may be formed adjacent to the cool air outlet.

The structure of the connecting portion 380 may adopt well-known various connecting structures and connecting methods. For example, the connecting portion 380 may be configured to have a hook structure.

Meanwhile, as illustrated in FIG. 9, at least one side 3011 and 3012 of the main body 301 according to this exemplary embodiment may have a mesh structure.

Since air may enter and exit through the mesh structure, cool air released from the cool air outlet of the artificial intelligence refrigerator 100 is admitted to the container 320 through the mesh structure formed on one side 3011 and 3012 of the main body 301. The food 1001 placed in the container 320 is refrigerated by the admitted cool air.

That is, the artificial intelligent food refrigerating device 300 according to this exemplary embodiment may refrigerate the food 1001 placed inside the container 320 and keep it at a low temperature by using cool air released from the cool air outlet of the refrigeration compartment 11 or freezing compartment 12 of the artificial intelligent refrigerator 100.

Moreover, at least one of the sides constituting the main body 301 may have a mesh structure. For example, if the main body 301 has a hexagonal shape, the top and bottom of the main body 301 may have a mesh structure. Furthermore, the left and right sides 3011 and 3012 besides the top and bottom may have a mesh structure. In addition, both the front and rear may have a mesh structure.

However, it is desirable that the portion of the main body 301 formed as the door 330 has no mesh structure. Since the inside of the container 320 needs to be opened and closed as the door 330 opens and closes, it is desirable that the portion formed as the door 330 has no mesh structure.

When the door 330 is closed, the inside of the container 320 needs to be enclosed from the outside by means of the door 330. Thus, it is desirable that the portion of the main body 301 formed as the door 330 has no mesh structure.

Meanwhile, the side of the main body 301 that faces the cool air outlet of the refrigeration compartment 11 or freezer compartment 12 of the artificial intelligent refrigerator 100 needs to have a mesh structure.

For example, assuming that the portion where the door 330 is formed is the front of the main body 301, as illustrated in FIG. 9, the left side 3011 or right side 3012 of the main body 301 needs to face the cool air outlet of the refrigeration compartment 11 or freezer compartment 12. Thus, at least one of the right side 3011 and left side 3012 of the main body 301 needs to have a mesh structure.

Moreover, a fan 351 may be added to the side of the main body 301 that faces the cool air outlet of the refrigeration compartment 11 or freezer compartment 12. For example, as illustrated in FIG. 9, in a case where the left side 3011 of the main body 301 faces the cool air outlet, the fan 351 may be installed on the left side 3011.

The fan 351 serves to force cool air coming from the cool air outlet of the refrigeration compartment 11 or freezer compartment 12 into the container 320.

The fan 351 is controlled by the controller 360, and the controller 360 may adjust the RPM of the fan 351. Through the control of the controller 360, the amount and speed of cool air admitted into the container 320 by the fan 351 may be adjusted.

Meanwhile, the adjustment of the amount and speed of cool air admitted affects the refrigeration rate of the inside of the container 320.

Additionally, the controller 360 may control the fan 351 to stop running if the temperature inside the container 320 drops to a set temperature or lower.

If the temperature inside the container 320 exceeds the set temperature after a certain amount of time after the fan 351 stops running, the controller 360 may allow cool air to flow into the container 320 by rotating the fan 351 again. That is, the controller 360 cools the inside of the container 320 and maintains the temperature after cooling.

That is, the fan 351 may send cool air released from the cool air outlet disposed in the refrigeration compartment 11 or freezer compartment 12 of the artificial intelligent refrigerator 100 into the container 320 in a more efficient way. Also, the fan 351 may circulate the air staying in the container 320.

Also, if the air staying in the container 320 reaches a given temperature or higher, the cool air released from the cool air outlet disposed in the refrigeration compartment 11 or freezer compartment 12 may be admitted into the container 320 so that the temperature inside the container 320 is kept constant.

Meanwhile, it is desirable that a damper 352 be installed on the opposite side of the side where the main body 301 faces the cool air outlet of the refrigeration compartment 11 or freezer compartment 12 of the artificial intelligent refrigerator 100. For example, as illustrated in FIG. 9, in a case where the left side 3011 of the main body 301 is the side facing the cool air outlet of the refrigeration compartment 11 or freezer compartment 12, the damper 352 may be preferably installed on the right side 3011.

In this case, it is desirable that both the left side 3011 of the main body 301 where the fan 351 is installed and the right side 3012 of the main body 301 where the damper 352 is installed have a mesh structure to circulate the air inside the container 320.

Also, the damper 352 illustrated in FIG. 9 is configured to open and close the right side 3012 of the main body 301.

Also, the damper 352 may be configured to comprise a plurality of blades 3521, 3522, and 3523 to open and close the right side 3012 of the main body 301. That is, the plurality of blades 3521, 3522, and 3523 are arranged in parallel on one side (the right side 3012 in FIG. 9) of the main body 301, and the blades 3521, 3522, and 3523 are configured to rotate within a certain angular range.

Accordingly, whether one side of the main body 301 is opened or not is determined depending on the angles of rotation of the blades 3521, 3522, and 3523.

For example, the right side 3012 of the main body 301 may be closed if the angles of rotation of the blades 3521, 3522, and 3523 illustrated in FIG. 9 are all 0 degrees. Also, the right side 3012 of the main body 301 may be fully opened if the angles of rotation of the blades 3521, 3522, and 3523 are all 90 degrees.

Moreover, the amount one side of the main body 301 is opened may be determined depending on the angles of rotation of the blades 3521, 3522, and 3523. For example, the controller 360 may determine that the right side 3012 of the main body 301 is open 10% if the angles of rotation of the blades 3521, 3522, and 3523 illustrated in FIG. 9 are all 10 degrees.

However, the damper 352 configured to comprise a plurality of blades 3521, 3522, and 3523 is only an illustrative example, and the damper 352 may be configured differently. That is, the damper 352 may not necessarily comprise a plurality of blades if configured to open and close one side of the main body 301.

Meanwhile, as described above, the controller 360 may control whether to open or close the damper 352 and the opening and closing degree. In this case, the controller 360 controls whether to open or close the damper 352 and the amount it is opened and closed, based on the temperature inside the container 320 measured by the third temperature sensor 341.

For example, if the controller 360 determines that the temperature inside the container 320 has increased by 1 degree C. or more, it may control the damper 352 to open and then send the air staying inside the container 320 out of the container 320 through the right side 3012 of the main body 301.

At this point, the controller 360 may increase the RPM of the fan 351 to release the air staying in the container 320 more quickly out of the container 320.

Additionally, the controller 360 may run the fan 351 to absorb the cool air released from the cool air outlet of the refrigeration compartment 11 or freezer compartment 12 of the artificial intelligent refrigerator 100 into the container 320.

Meanwhile, the artificial intelligent food refrigerating device 300 illustrated in FIG. 9 may interface with the artificial intelligent refrigerator 100 through the third communication unit 370.

For example, if the third communication unit 370 has a Wi-Fi function, the artificial intelligent food refrigerating device 300 may be connected to the artificial intelligent refrigerator 100 for data communication via Wi-Fi.

An example in which the artificial intelligent food refrigerating device 300 interfaces with the artificial intelligent refrigerator 100 through the third communication unit 370 will be given below.

First of all, the artificial intelligent food refrigerating device 300 is disposed inside the refrigeration compartment 110 of the artificial intelligent refrigerator 100 and starts operating when switched on. The artificial intelligent food refrigerating device 300 receives information on the temperature of the refrigeration compartment 11 of the artificial intelligent refrigerator 100 through the third communication unit 370.

The artificial intelligent food refrigerating device 300 may affect how the temperature of the refrigeration compartment 11 is maintained, since it refrigerates food by using cool air supplied to the refrigeration compartment 11. Accordingly, the artificial intelligent food refrigerating device 300 may set the allowable range of increase in the temperature of the refrigeration compartment 11 or change the set temperature of the refrigeration compartment 11.

For example, if the temperature of the refrigeration compartment 11 of the artificial intelligent refrigerator 100 is 5 degrees C., the artificial intelligent food refrigerating device 300 may set the allowable range of increase in the temperature of the refrigeration compartment 11 to +3 degrees C.

That is, if the temperature of the refrigeration compartment 11 of the artificial intelligent refrigerator 100 increases from 5 degrees C. to 8 degrees C. by the operation of the artificial intelligent food refrigerating device 300, the artificial intelligent food refrigerating device 300 determines that the temperature change in the refrigeration compartment 11 is normal. On the other hand, if the temperature of the refrigeration compartment 11 increases from 5 degrees C. to 9 degrees C. or from 5 degrees C. to 10 degrees C., it may be decided that the temperature of the refrigeration compartment 11 needs to be reduced.

When the artificial intelligent food refrigerating device 300 is turned on inside the refrigeration compartment 11, the cool air supplied to the refrigeration compartment 11 moves to the container 320 of the artificial intelligent food refrigerating device 300 but cannot cool the refrigeration compartment 11, thereby increasing the temperature of the entire refrigeration compartment 11.

In this case, the artificial intelligent refrigerator 100 may switch to quick cooling mode in order to reduce the temperature of the refrigeration compartment 11. However, as described above, the artificial intelligent refrigerator 100 does not need to change the mode as long as the set temperature of the refrigeration compartment 11 of the artificial intelligent refrigerator 100 can be changed within a certain range.

Accordingly, in the above-described example, once the temperature of the refrigeration compartment 11 of the artificial intelligent refrigerator 100 is set to change within the range of +3 degrees C. from 5 degrees C. as soon as the artificial intelligent food refrigerating device 300 starts operating, the artificial intelligent refrigerator 100 may run the refrigeration compartment 11 in general mode as long as the temperature of the refrigeration compartment does not exceed 8 degrees C.

In the above example, if the temperature of the refrigeration compartment 11 exceeds 8 degrees C. and reaches 9 degrees C., that is, increases by +4 degrees from 5 degrees, the artificial intelligent food refrigerating device 300 opens the damper 352 to send the air staying inside the container 320 to the refrigeration compartment 11.

In this case, the artificial intelligent food refrigerating device 300 does not determine whether the temperature inside the container 320 has increased to a temperature higher than a first container temperature which is set to achieve a second food temperature, but instead opens the damper 352 to let cool air in to the refrigeration compartment 11.

This is to prevent other food stored in the refrigeration compartment 11 from rotting due to a large increase in the temperature of the refrigeration compartment 11 caused by the refrigeration of the food 1001 stored in the artificial intelligent food refrigerating device 300 is refrigerated.

Accordingly, the artificial intelligent food refrigerating device 300 may collect information from that artificial intelligent refrigerator 100 that the temperature of the refrigeration compartment 11 is increasing beyond the allowable range of increase, and may change the operation mode of the artificial intelligent food refrigerating device 300 so as to refrigerate the food 1001 stored in the artificial intelligent food refrigerating device 300 while preventing rotting of the food placed in the refrigeration compartment 11 of the artificial intelligent refrigerator 100 based on the collected information.

Particularly, when refrigerating the food 1001 stored in the artificial intelligent food refrigerating device 300 while supplying cool air to the refrigeration compartment 11 of the artificial intelligent refrigerator 100, the artificial intelligent food refrigerating device 300 may operate as follows.

The artificial intelligent food refrigerating device 300 may open the damper 352 and increase the RPM of the fan 351 to allow the cool air released from the cool air outlet of the refrigeration compartment 11 of the artificial intelligent refrigerator 100 to flow into the refrigeration compartment 11 through the container 320.

Afterwards, if the temperature of the refrigeration compartment 11 is within the allowable range of increase or the temperature of the refrigeration compartment 11 drops to 5 degrees C. or lower, the artificial intelligent food refrigerating device 300 may close the damper 352 and concentrate on refrigerating the food 1001 stored in the artificial intelligent food refrigerating device 300.

Particularly, if the damper 352 comprises a plurality of blades 3521, 3522, and 3523, the artificial intelligent food refrigerating device 300 may adjust the amount and speed of cool air admitted into the refrigeration compartment 11 by adjusting the angles of rotation of the blades 3521, 3522, and 3523 according to changes in the temperature of the refrigeration compartment 11 of the artificial intelligent refrigerator 100.

That is, the artificial intelligent food refrigerating device 300 may refrigerate the food placed in the container 320 and at the same time maintain the temperature of the refrigeration compartment 11 of the artificial intelligent refrigerator 100 by adjusting the angles of rotation of the blades 3521, 3522, and 3523.

Also, if necessary, the artificial intelligent food refrigerating device 300 may regulate in such a manner that more cool air is used to refrigerate the food placed in the container 320 or to maintain the temperature of the refrigeration compartment 11.

Meanwhile, the artificial intelligent food refrigerating device 300 itself may find out the ratio of cool air flow to be provided to the container 320 and cool air flow to be provided to maintain the temperature of the refrigeration compartment 11 of the artificial intelligent refrigerator 100 and the angles of rotation of the blades 3521, 3522, and 3523 required to achieve this ratio.

As in the above-described example, the artificial intelligent food refrigerating device 300 may interface with the artificial intelligent refrigerator 100 by receiving status information including the temperature and operation mode of the refrigeration compartment 11 or freezer compartment 12 from the artificial intelligent refrigerator 100 through the third communication unit 370 and controlling the operation of the second temperature regulating unit 350.

Moreover, the artificial intelligent food refrigerating device 300 also may interface with user equipment 200 through the third communication unit 370. That is, the artificial intelligent food refrigerating device 300 may calculate a first time, which is the time it takes to complete refrigeration of the food 1001 stored in it—that is, the time it takes to change from a first food temperature to a second food temperature—and transmits the first time to the user equipment 200. The user equipment 200 may display the first time in the form of a timer, as illustrated in FIG. 11.

In addition, the user equipment 200 and the artificial intelligent food refrigerating device 300 may interface with each other by changing the operation mode of the artificial intelligent food refrigerating device 300 through the user equipment 200.

Meanwhile, the controller 360 and the image capture unit 310 may be mounted to a portion of the main body 301. For example, referring to FIG. 9, a PCB, where the controller 360 is implemented, and the FLIR camera 311, which is an example of the image capture unit 310, may be mounted to an upper edge of the right side 3012 of the main body 301.

Particularly, the FLIR camera 311 may generate a first image by capturing the food 1001 before or at the moment when it is put into the container 320. The FLIR camera 311 transmits the first image to the controller 360, and the controller 360 may check the type, size, volume, and quantity of the food to be put into the container 320 by analyzing the first image.

Figure 10:
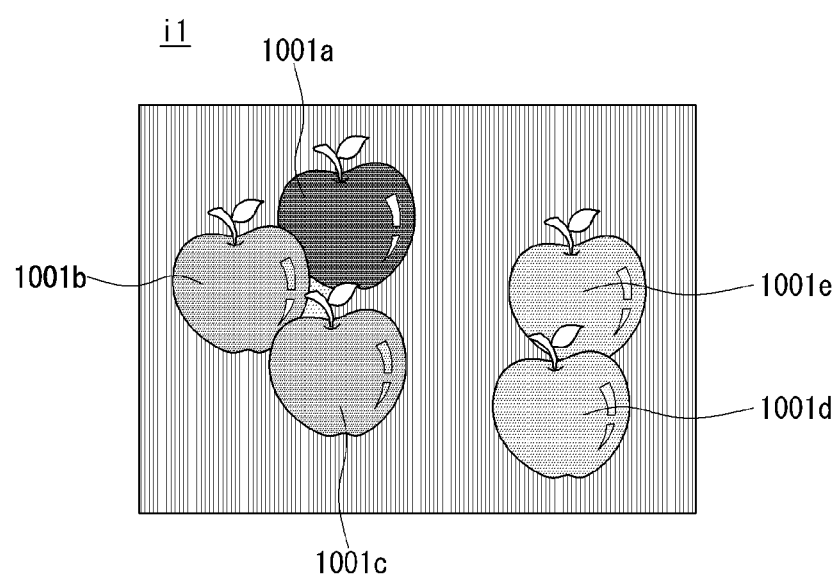
FIG. 10 is a diagram showing a first image generated by capturing food by a camera according to an exemplary embodiment of the present disclosure.

Referring to FIG. 10, a process in which the camera 311 captures food and generates a first image and the controller 360 analyzes the first image will be described in concrete details.

FIG. 10 is a diagram showing a first image generated by capturing food by a camera according to an exemplary embodiment of the present disclosure.

The FLIR camera 311 according to an exemplary embodiment of the present disclosure generates a first image i1 by capturing food to be put into the container 320. The first image i1 is an infrared image captured of the food by infrared photography.

An infrared image of the food generated by the FLIR camera 311 is transmitted to the controller 360, and the controller 360 determines the type, size, volume, and temperature of the food by analyzing the form, shape, and color of the object represented on the infrared image.

For example, as illustrated in FIG. 10, once the FLIR camera 311 generates a first image i1 by capturing the food 1001 before it is put into the container 320, the controller 360 analyzes the generated first image i1.

In this instance, the controller 360 may determine what the object included in the first image i1 is through an image recognition model.

The image recognition model may determine whether the object is food or not, by setting feature points on the object and analyzing the relationship of the feature points. Also, once it is decided that the object is food, the controller 360 may determine the type, size, volume, and temperature of the food again by using the image recognition model.

Referring to FIG. 10, the controller 360 may deduce that the type of the food to be put into the container 320 is fruit, and, more specifically, apple, as a result of analysis of the first image i1 using the image recognition model.

Also, the controller 360 may conclude that the first image i1 is a representation of five apples as a result of analysis of the first image. Accordingly, the controller 360 may recognize that the food to be put into the container 320 is five apples. The controller 360 may recognize that the apples are first to fifth apples 1001a, 1001b, 1001c, 1001d, and 1001e.

Meanwhile, the controller 360 may analyze the respective colors of the first to fifth apples 1001a, 1001b, 1001c, 1001d, and 1001e in the first image i1 and identify the temperatures of the first to fifth apples 1001a, 1001b, 1001c, 1001d, and 1001e before they are put into the container 320.

Referring to FIG. 10, the first apple 1001a is more bluish than the second to fifth apples 1001b, 1001c, 1001d, and 1001e. The controller 360 may determine the temperature of the first apple 1001a by analyzing the spectrum of the color represented by the first apple 1001a.

Also, the controller 360 may determine that the first apple 1001a has a lower temperature than the second to fifth apples 1001b, 1001c, 100d, and 1001e.

Meanwhile, referring to FIG. 10, the fourth and fifth apples 1001d and 1001e are more reddish-yellow than the second and third apples 1001b and 1001c.

The controller 360 may determine the temperatures of the fourth and fifth apples 1001d and 1001e by analyzing the spectrum of the colors represented by the fourth and fifth apples 1001d and 1001e, and may determine that the fourth and fifth apples 1001*d* and 1001*e* have a higher temperature than the second and third apples 1001*b* and 1001*c*.

Moreover, the controller 360 may learn result data generated by the analysis of the temperatures of the first to fifth apples 1001*a*, 1001*b*, 1001*c*, 1001*d*, and 1001*e* by AI learning, and determine the optimum temperature for storing apples by itself.

Also, the controller 360 may determine a target refrigeration temperature for apples through AI learning. Here, the target refrigeration temperature for apples refers to the temperature of apples at which people find apples taste best when eaten.

In this exemplary embodiment, the temperature of the food 1001 before the food 1001 is put into the container 320 may be referred to as a first food temperature, and the above-mentioned target refrigeration temperature may be referred to as a second food temperature. Also, the above-mentioned optimal temperature for storage may be referred to as a first container temperature.

In addition, the controller 360 may identify the type of the food to be put into the container 320 as liquid as a result of analysis of the first image i1 using the image recognition model. In this case, the target refrigeration temperature of the food to be put into the container 320, that is, the second food temperature, may be determined within a first range.

Here, the first range may be set by the user or an administrator, or the controller 360 may determine the second food temperature suitable for the liquid food through AI learning.

For example, if the food to be put into the container 320 is identified as beer, the controller 360 may set the second food temperature within the range of 2 degrees above zero to 5 degrees above zero. In this case, the first range is from 2 degrees above zero to 5 degrees above zero.

Furthermore, the controller 360 may identify the type of the food to be put into the container 320 as solid as a result of analysis of the first image i1 using the image recognition model. In this case, the target refrigeration temperature of the food to be put into the container 320, that is, the second food temperature, may be determined within a second range.

Here, the second range may be set by the user or an administrator, or the controller 360 may determine the second food temperature suitable for the solid food through AI learning.

For example, if the food to be put into the container 320 is identified as watermelon, the controller 360 may set the second food temperature within the range of 1 degree above zero to 5 degrees above zero. In this case, the first range is from 1 degrees above zero to 5 degrees above zero.

Meanwhile, the controller 360 may share the first food temperature, second food temperature, and first container temperature for the first to fifth apples 1001*a*, 1001*b*, 1001*c*, 1001*d*, and 1001*e* and the AI learning results thereof with the user terminal 200 and other AI devices. Also, the controller 260 may obtain information about the second food temperature and first container temperature from the user terminal 200 and other AI devices.

In this manner, the controller 360 of the artificial intelligent food refrigerating device 300 according to this exemplary embodiment may analyze the first image i1 which represents what the food 1001 looks like before it is put into the container 320, determine the first food temperature which is the temperature of the food before it is put into the container 320, and determine the optimal temperature for storing the food 1001 as the first container temperature.

Also, the controller 360 according to this exemplary embodiment may determine the second food temperature, which is a target temperature the food 1001 stored in the container 320 has to reach to taste best.

Furthermore, the controller 360 controls the second temperature regulating unit 350 such that the temperature inside the container 320 reaches the first container temperature.

Meanwhile, the controller 360 may calculate the time it takes for the temperature inside the container 320 to reach the first container temperature and the time it takes to reach the second food temperature from the first food temperature.

Particularly, the time it takes to reach the second food temperature, which is the target refrigeration temperature of the food, from the first food temperature, which is the temperature of the food before it is stored in the container 320, may be referred to as the first time.

The controller 360 calculates the first time by taking into account the type, size, and volume of the food and the first container temperature and transmits the calculated first time to the user equipment 200.

The user terminal 200 may display the calculated first time in the form of a timer. Referring to FIG. 11, there is shown an exemplary embodiment of the user equipment 200 where the first time calculated by the controller 360 is displayed in the form of a timer.

FIG. 11 is a diagram showing user equipment interfacing with an artificial intelligent food refrigerating device according to an exemplary embodiment of the present disclosure.

Referring to FIG. 11, the user equipment 200 may show a first display area 210 and a second display area 220 separately through a display.

As illustrated in FIG. 11, the first time calculated by the controller 360 may be displayed in the form of a timer m1 in the first display area 210. Also, the type, size, and volume of the food 1001 and a plurality of icons o1 and o2 for determining the operation mode of the artificial intelligent food refrigerating device 300 may be displayed together in the first display area 210.

The user may control the on/off of the artificial intelligent food refrigerating device 300 by touching the icon o1, and may select to allow the artificial intelligent food refrigerating device 300 to automatically recognize the food 100 being put into it and automatically refrigerate the food.

Meanwhile, the artificial intelligent food refrigerating device 300 may periodically capture the food 1001 being stored in the container 320 by using the camera 311 to generate a second image i2.

If the camera 311 according to this exemplary embodiment is configured as an FLIR camera 311, the second image i2 generated by capturing the food 1001 being stored in the container 320 by the FLIR camera 311 is an infrared image of the food 1001.

Figure 12:
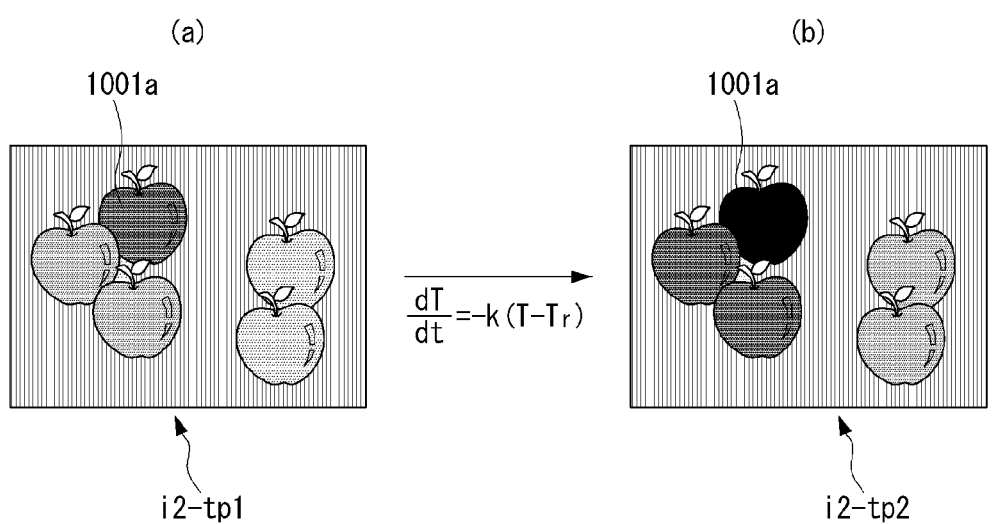
FIG. 12 is a diagram showing second images periodically captured of food being stored in the container by the image capture unit according to an exemplary embodiment of the present disclosure.

Referring to FIG. 12, there is shown an example of infrared images generated by periodically capturing the food being stored in the container by the image capture unit according to an exemplary embodiment of the present disclosure.

FIG. 12 is a diagram showing second images periodically captured of food being stored in the container by the image capture unit according to an exemplary embodiment of the present disclosure.

Assuming that the time t when the food 1001 is put into the container 320 is a first point in time tp1, (a) of FIG. 12 represents a second image i2-tp1 generated by capturing the food 1001 at the first point in time tp1 by the FLIR camera 311.

Also, assuming that a second point in time tp2 is after a certain period of time from the first point in time tp1, (b) of FIG. 12 represents a second image i2-tp2 generated by capturing the food 1001 at the second point in time tp2 by the FLIR camera 311.

Here, the certain period of time may be changed by the user's or administrator's settings. It should be noted that the following description will be given of an example in which the time gap between the first point in time tp1 and the second point in time tp2, i.e., the certain period of time, is 1 minute, for convenience of explanation.

Also, the controller 360 identifies a change in the temperature of the food being stored in the container 320 by comparatively analyzing the second image i2-tp1 for the first point in time tp1 and the second image i2-tp2 for the second point in time tp2.

That is, as illustrated in (a) of FIG. 12, the controller 360 determines the temperature of the first apple 1001a at the first point in time tp1 by analyzing the color of the first apple 1001a shown on the second image i2-tp1 for the first point in time tp1.

Also, as illustrated in (b) of FIG. 12, the controller 360 analyzes the second image i2-tp2 captured of the first apple 1001a at the second point in time tp2 which is 1 minute after the first point in time tp1.

At this point, the controller 360 determines the temperature of the first apple 1001a at the second point in time tp2 by analyzing the color of the first apple 1001a shown on the second image i2-tp2 for the second point in time tp2.

Also, the controller 360 calculates the amount of change in the temperature of the first apple 1001a made during 1 minute by comparing the temperature to of the first apple 1001a for the first point in time tp1 and the temperature $t_1$ of the first apple 1001a for the second point in time tp2.

Moreover, the controller 360 calculates the first time required for the first apple 1001a to reach the second food temperature, which is the target refrigeration temperature, by the following Equation 1:

$$\frac{dT}{dt} = -k(T - T_r) \quad \text{[Equation 1]}$$

where T is temperature, dT is the rate of change of temperature, t is time, and dt is the rate of change of time. k is a proportional constant, and $T_r$ is the temperature inside the container 320. Here, $T_r$ is the first container temperature.

That is, $T_r$ is the temperature that needs to be achieved inside the container 320, in order for the food 1001 to reach the second food temperature from the first food temperature, which is the temperature of the food 1001 before it is put into the container 320.

In the above Equation 1, the proportional constant k is determined by the rate at which the food 1001 placed inside the container 320 is refrigerated during 1 minute. Accordingly, the proportional constant k is determined by calculating the temperature to of the first apple 1001a through the second image i2-tp1 for the first point in time tp1 acquired through the FLIR camera 311 and calculating the temperature $t_1$ of the first apple 1001a through the second image i2-tp2 at the second point in time tp2 which is 1 minute after the first point in time tp1.

Once the proportional constant k is determined, the controller 360 may calculate the time t it takes to reach the second food temperature, which is the target refrigeration temperature. Here, the time t represents the above-mentioned first time.

Below is a concrete example in which the controller 360 calculates the first time by substituting the temperature to of the food calculated at the first point in time tp1 and the temperature $t_1$ of the food calculated at the second point in time tp2 into Equation 1.

For example, assuming that the food 1001 is beer, the controller 360 according to this exemplary embodiment may calculate the second food temperature, which is the target refrigeration temperature for beer, as 41 F (Fahrenheit) through AI learning.

Also, the controller 360 may calculate the temperature inside the container 320, that is, the first container temperature, as 5 F (Fahrenheit) through AI learning, in order for beer to have the second food temperature.

Moreover, the controller 360 may calculate the temperature to of the beer as 68 F (Fahrenheit) at the point in time tp1 by analyzing the second image i2-tp1 generated by the FLIR camera 311 at the point in time tp1 when the beer is put into the container 320.

Also, the controller 360 may calculate the temperature to of the beer as 64.6 F (Fahrenheit) for the second point in time tp2 by analyzing the second image i2-tp2 of the beer generated by the FLIR camera 311 at the second point in time tp2 which is 1 minute after the first point in time tp1.

In this case, the controller 360 may calculate the first time t as follows by the above Equation 1.

$t_0$=68 F, $t_1$=64.4 F, $T_r$=5 F, second food temperature=41 F $$\frac{dT}{dr} = -k(T - T_r) \quad \text{[Equation 1]}$$

$$y(t) = A \cdot e^{kt} + T_r$$

$$68 = A + 5$$

$$A = 63$$

$$y(t) = 63 \cdot e^{kt} + 5$$

$$y(1) = 64.4 = 63 \cdot e^{k} + 5$$

$$k = -0.0589$$

$$y(t) = 63 \cdot e^{-0.0589 \cdot t} + 5$$

$$41 = 63 \cdot e^{-0.0589 \cdot t} + 5$$

$$t = 9.5$$

The above theorem shows that it takes 9.5 minutes to change the temperature of the beer from 68 F (Fahrenheit) to 41 F (Fahrenheit).

The above-described process of calculating the first time is merely an example, and the artificial intelligent food refrigerating device 300 according to the present disclosure may calculate the first time by other methods.

For example, the controller 360 may apply the first time differently depending on the type of food to be put into the container 320. That is, if the food to be put into the container 320 is identified as liquid, the controller 360 may set the first time within a range of 10 to 15 minutes. The range of 10 to 15 minutes may be referred to as a third range.

Also, if the food to be put into the container 320 is identified as solid, the controller 360 may set the first time within a range of 5 to 10 minutes. The range of 5 to 10 minutes may be referred to as a fourth range.

When setting the third range, which defines the time it takes to refrigerate liquid, and the fourth range, which defines the time it takes to refrigerate solid, the controller 360 may refer to a previous history of refrigerating food.

That is, if the artificial intelligent food refrigerating device 300 has a previous history of refrigerating water, it may set the third range based on records about the first time required to refrigerate water to the second food temperature.

Also, if the artificial intelligent food refrigerating device 300 has a previous history of refrigerating apples, it may set the fourth range based on records about the first time required to refrigerate apples to the second food temperature.

If there is no such history, the controller 360 may set the third range and the fourth range based on AI learning results.

Meanwhile, the second sensing unit 340 of the artificial intelligent food refrigerating device 300 according to the present disclosure comprises a third temperature sensor 341 and a fourth temperature sensor 342. Thus, the artificial intelligent food refrigerating device 300 may measure the temperature outside the container 320 and the temperature around the artificial intelligent refrigerator 100.

Also, the artificial intelligent food refrigerating device 300 measures the temperature inside the container 320 and the temperature of the food located in the container 320.

For example, the fourth temperature sensor 342 may be mounted to the bottom surface of the artificial intelligent food refrigerating device 300, and may be configured to measure the temperature of the food 1001 placed in the container 320 by direct contact with the food 1001.

Also, the controller 360 may be configured to receive feedback about a change in the temperature of the food 1001 placed in the container 320 through the fourth temperature sensor 342 and automatically change the operation mode of the second temperature regulating unit 350.

The operation mode of the second temperature regulating unit 350 may include, for example, a quick cooling mode and a temperature-maintaining mode.

Moreover, the controller 360 according to this exemplary embodiment may not be able to capture food by the camera 311 before the food is put into the container. In this case, the controller 360 may determine the temperature outside the container 320 and the temperature around the artificial intelligent refrigerator 100, which are measured by the third temperature sensor 341, as the first food temperature, in order to determine the first food temperature.

In this manner, the artificial intelligent food refrigerating device 300 according to the present disclosure may identify the type, size, volume, and quantity of food to be put into the container 320 and set different target refrigerant temperatures for different types of food.

Also, the artificial intelligent food refrigerating device 300 may refrigerate the food being stored inside the artificial intelligent refrigerating device 300 and, at the same time, maintain the temperature of the refrigeration compartment 11 or freezer compartment 12 of the artificial intelligent refrigerator 100, by using the refrigeration capability of the artificial intelligent refrigerator 100.

Also, the artificial intelligent food refrigerating device 300 according to the present disclosure may interface with the artificial intelligent refrigerator 100 and adjust both the refrigeration efficiency of the food being stored inside the artificial intelligent food refrigerating device 300 and the efficiency of maintaining the refrigeration compartment 11 and freezer compartment 12 of the artificial intelligent refrigerator 100.

Moreover, the artificial intelligent food refrigerating device 300 according to the present disclosure calculates the time it takes for the food being stored inside to reach the target refrigeration temperature and displays it through user equipment so that the user can easily refrigerate food they want to eat later.

Hereinafter, referring to FIGS. 13 through 15, a method for refrigerating food by an artificial intelligent food refrigerating device according to an exemplary embodiment of the present disclosure will be described in concrete details.

In describing the method for refrigerating food by the artificial intelligent food refrigerating device, a detailed description of the same parts as those explained with respect to the above-described artificial intelligent food refrigerating device will be omitted. Also, the same constituent elements will be denoted by the same reference numerals.

Figure 13:
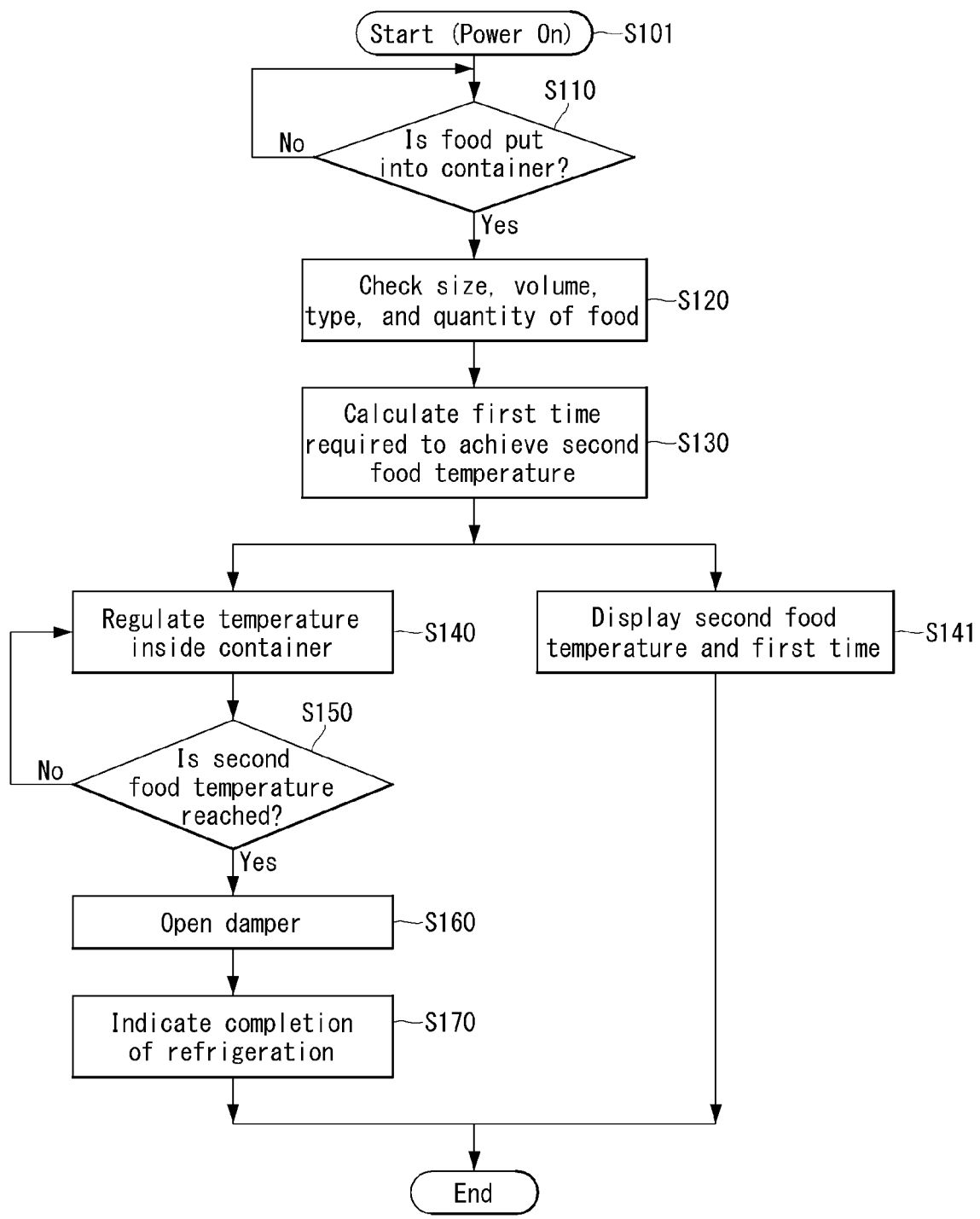
FIG. 13 is a sequential diagram showing a method for refrigerating food by an artificial intelligent food refrigerating device according to an exemplary embodiment of the present disclosure.

FIG. 13 is a sequential diagram showing a method for refrigerating food by an artificial intelligent food refrigerating device according to an exemplary embodiment of the present disclosure.

Referring to FIG. 13, firstly, the user turns on the artificial intelligent food refrigerating device 300 by manipulating the power of the artificial intelligent food refrigerating device 300 (S101). In a case where the artificial intelligent food refrigerating device 300 is interfacing with user equipment 200, the user may turn on the artificial intelligent food refrigerating device 300 by entering a command on the user equipment 200 to power on the artificial intelligent food refrigerating device 300 without directly manipulating the power of the artificial intelligent food refrigerating device 300 (S101).

Moreover, the artificial intelligent food refrigerating device 300 may power itself on when the user opens the door 330 (S101).

Afterwards, the artificial intelligent food refrigerating device 300 decides whether the user puts food 1001 into the container 320 (S110). The artificial intelligent food refrigerating device 300 may capture food passing through the door 330 by using the image capture unit 310 and transmit it to the controller 360 to decide whether the food is being put into the container 320 (S110).

Furthermore, the artificial intelligent food refrigerating device 300 may recognize food passing through the door 330 by various sensors included in the second sensing unit 340. For example, if the second sensing unit 340 comprises an infrared sensor or laser sensor, the artificial intelligent food refrigerating device 300 may sense food passing through the door 330 by the second sensing unit 340.

The artificial intelligent food refrigerating device 300 may decide whether the food has passed through the door 330 and is now placed in the container 320 (S110). If the food is not put into the container 320, the artificial intelligent food refrigerating device 300 may go into a standby mode.

The standby mode refers to a state in which the artificial intelligent food refrigerating device 300 can wait at low power. The artificial intelligent food refrigerating device 300 may sense and decide whether the food has passed through the door 330 and is now placed in the container 320 even in the standby mode.

Meanwhile, if it is decided that the food has passed through the door 330 and is now placed in the door 330, the artificial intelligent food refrigerating device 300 checks the type, size, volume, and quantity of the food put into the container 320 by the image capture unit 310.

Particularly, in the step S120, the artificial intelligent food refrigerating device 300 may capture the food by using the FLIR camera 311 included in the image capture unit 310, just before the food is put into the container 320, and determine the temperature of the food before it is put into the container 320. The artificial intelligent food refrigerating device 300 may analyze the temperature of the food before it is put into the container 320 and classify it as a first food temperature as a result of the analysis.

Figure 14:
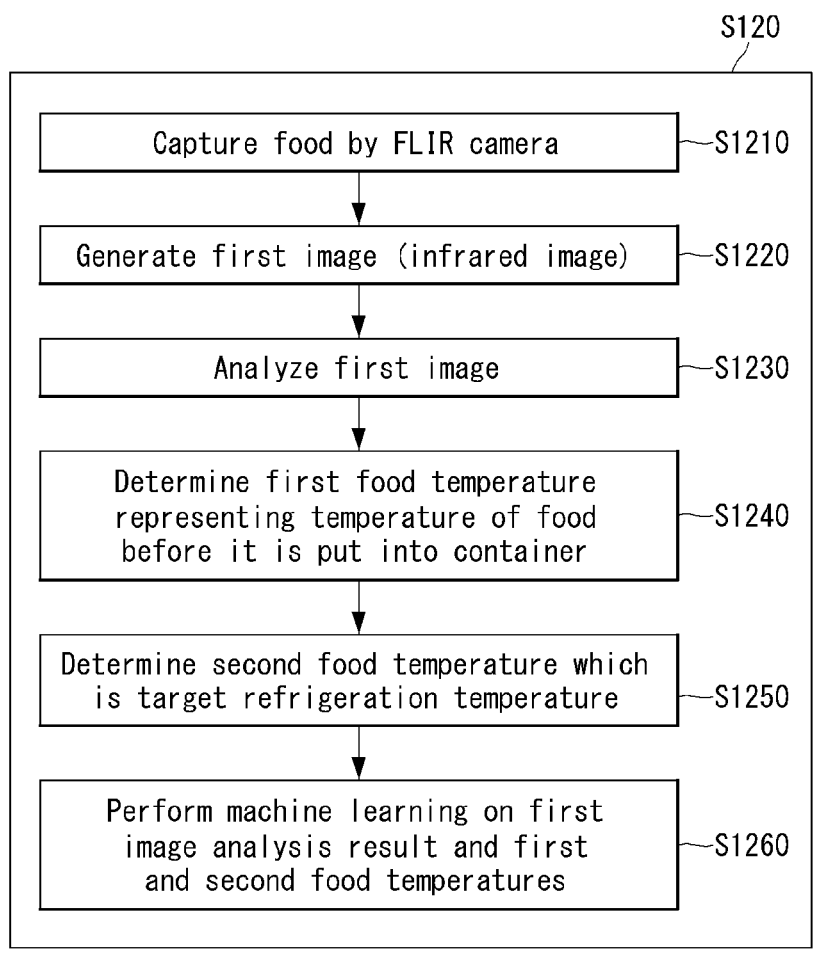
FIG. 14 is a sequential diagram showing a method in which an artificial intelligent food refrigerating device determines a first food temperature for food to be put into the container according to an exemplary embodiment of the present disclosure.

Referring to FIG. 14, a method in which the artificial intelligent food refrigerating device 300 determines a first food temperature for food to be put into the container 320 will be described in concrete details.

FIG. 14 is a sequential diagram showing a method in which an artificial intelligent food refrigerating device 300 determines a first food temperature for food to be put into the container 320 according to an exemplary embodiment of the present disclosure.

Referring to FIG. 14, in the step S120, the artificial intelligent food refrigerating device 300 captures food to be put into the container 320 (S1210), and generates an infrared image of the food before it is put into the container 320 (S1220). The infrared image of the food to be put into the container 320 may be referred to as a first image.

Once the first image is generated (S1220), the artificial intelligent food refrigerating device 300 analyzes the first image (S1230). In the step S1230, the artificial intelligent food refrigerating device 300 analyzes the temperature of the food before it is put into the container 320, based on the color of the food represented in the generated first image.

The artificial intelligent food refrigerating device 300 determines a first food temperature, which is the temperature of the food before it is put into the container 320, based on an analysis result inferred in the step S1230 (S1240). Also, the artificial intelligent food refrigerating device 300 may determine a second food temperature, which is a target refrigeration temperature for the food, by taking into consideration the type, size, volume, and quantity of the food (S1260).

Here, the target refrigeration temperature for the food refers to the temperature at which people find the food taste best when eaten.

Meanwhile, the artificial intelligent food refrigerating device 300 may perform machine learning on the first image analysis result and the first and second food temperatures and use the machine learning results when the same type of food is put into the artificial intelligent food refrigerating device 300 and stored in it later.

Afterwards, the artificial intelligent food refrigerating device 300 may calculate a first time, which is the time it takes for the food put into the container 320 to reach the second food temperature from the first food temperature (S130).

Particularly, in the step S130, the artificial intelligent food refrigerating device 300 continuously captures the food put into the container 320 at certain time intervals, analyzes images captured at these time intervals, and calculates the first time, which is the time it takes for the food put into the container 320 to reach the second food temperature from the first food temperature (S130).

Figure 15:
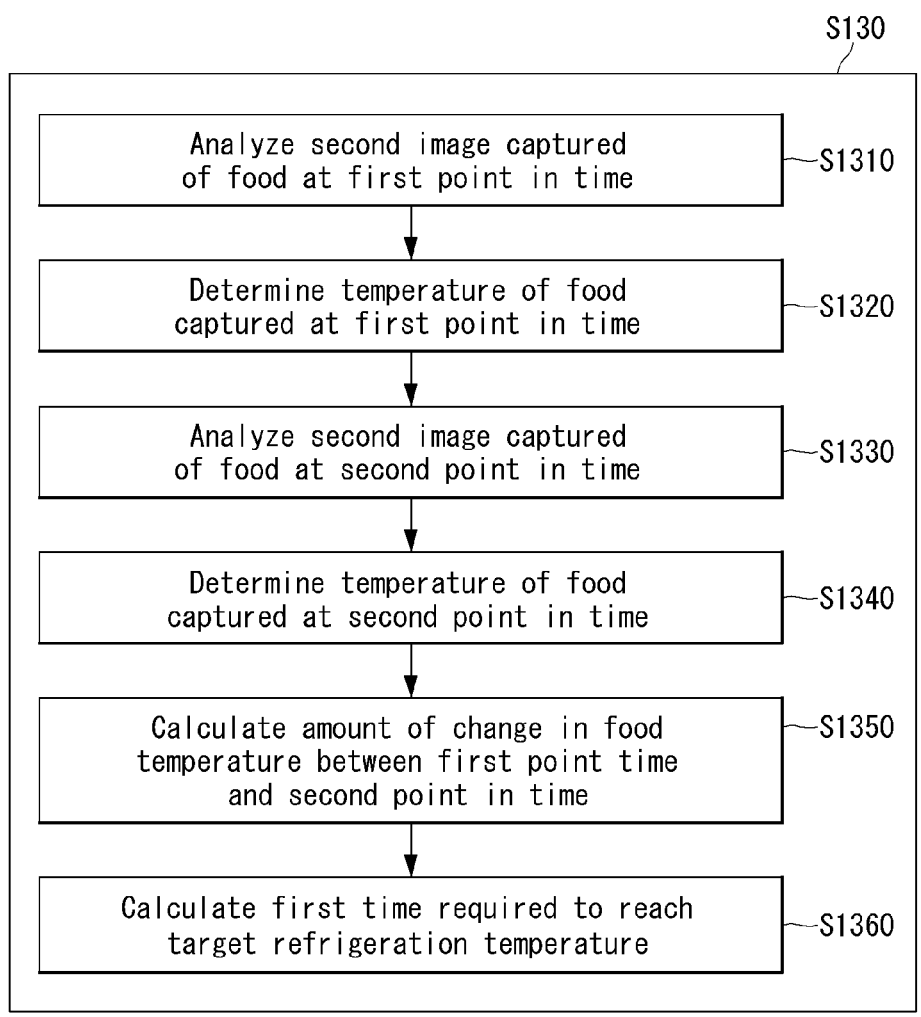
FIG. 15 is a sequential diagram showing a method for calculating a first time required for an artificial intelligent food refrigerating device to reach a target refrigeration temperature according to an exemplary embodiment of the present disclosure.

Referring to FIG. 15, a method for calculating a first time required for the artificial intelligent food refrigerating device 300 to reach a target refrigeration temperature will be described in concrete details.

FIG. 15 is a sequential diagram showing a method for calculating a first time required for an artificial intelligent food refrigerating device 300 to reach a target refrigeration temperature according to an exemplary embodiment of the present disclosure.

Referring to FIG. 15, the artificial intelligent food refrigerating device 300 according to an exemplary embodiment analyzes a second image captured of food at a first point in time (S1310). As illustrated in (a) of FIG. 12, the first point in time tp1 represents a time at which the food 1001 is put into the container 320, and the second image represents an infrared image i2-tp1 generated by capturing the food 1001 at the first point in time tp1 by the FLIR camera 311.

Afterwards, the artificial intelligent food refrigerating device 300 determines the temperature of the food captured at the first point in time based on a result of analysis of the second image generated at the first point in time tp1 (S1320).

The artificial intelligent food refrigerating device 300 then analyzes the second image captured of the food at a second point in time. As illustrated in (b) of FIG. 12, the second point in time tp2 represents a time that is after a certain period of time from the first point in time tp1, and the second image represents an infrared image i2-tp2 generated by capturing the food 1001 at the second point in time tp2 by the FLIR camera 311.

Also, the artificial intelligent food refrigerating device 300 determines the temperature of the food captured at the second point in time tp2 based on a result of analysis of the second image generated at the second point in time tp2 (S1340).

The time gap between the first point in time tp1 and the second point in time tp2 may be changed by the user's or administrator's settings.

Also, the artificial intelligent food refrigerating device 300 calculates the amount of change in the temperature of the food being stored in the container 320 by comparatively analyzing the second image i2-tp1 for the first point in time tp1 and the second image i2-tp2 for the second point in time tp2 (S1350).

That is, as illustrated in (a) of FIG. 12, the controller 360 determines the temperature of the first apple 1001a at the first point in time tp1 by analyzing the color of the first apple 1001a shown on the second image i2-tp1 for the first point in time tp1.

Here, assuming that the time gap between the first point in time tp1 and the second point in time tp2 is 1 minute, the controller 360 analyzes the second image i2-tp2 captured of the first apple 1001a at the second point in time tp2 which is 1 minute after the first point in time tp1, as illustrated in (b) of FIG. 12. At this point, the controller 360 determines the temperature of the first apple 1001a at the second point in time tp2 by analyzing the color of the first apple 1001a shown on the second image i2-tp2 for the second point in time tp2.

Also, the controller 360 of the artificial intelligent food refrigerating device 300 calculates the amount of change in the temperature of the first apple 1001a made during 1 minute by comparing the temperature to of the first apple 1001a for the first point in time tp1 and the temperature $t_1$ of the first apple 1001a for the second point in time tp2.

Moreover, the controller 360 calculates the first time required for the first apple 1001a to reach the second food temperature, which is the target refrigeration temperature, by the following Equation 1:

$$\frac{dT}{dr} = -k(T - T_r) \qquad \text{[Equation 1]}$$

where T is temperature, dT is the rate of change of temperature, t is time, and dt is the rate of change of time. k is a proportional constant, and $T_r$ is the temperature inside the container 320. Here, $T_r$ is the first container temperature.

That is, $T_r$ is the temperature that needs to be achieved inside the container 320, in order for the food 1001 to reach the second food temperature from the first food temperature, which is the temperature of the food 1001 before it is put into the container 320.

In the above Equation 1, the proportional constant k is determined by the rate at which the food 1001 placed inside the container 320 is refrigerated during 1 minute. Accordingly, the proportional constant k is determined by calculating the temperature to of the first apple 1001*a* through the second image i2-tp1 for the first point in time tp1 acquired through the FLIR camera 311 and calculating the temperature $t_1$ of the first apple 1001*a* through the second image i2-tp2 at the second point in time tp2 which is 1 minute after the first point in time tp1.

Once the proportional constant k is determined, the controller 360 may calculate the time t it takes to reach the second food temperature, which is the target refrigeration temperature. Here, the time t represents the above-mentioned first time.

Afterwards, the artificial intelligent food refrigerating device 300 regulates the temperature inside the container 320 in order for the food being stored in it to have the second food temperature (S140).

Moreover, the artificial intelligent food refrigerating device 300 may display the second food temperature and the first time (S141). The artificial intelligent food refrigerating device 300 may display the second food temperature and the first time by itself through a built-in display. Alternatively, the artificial intelligent food refrigerating device 300 may display the second food temperature and the first time through user equipment 200 interfacing with it.

That is, the artificial intelligent food refrigerating device 300 may calculate the second food temperature and the first time and transmit them to the user equipment 200, and the user equipment 200 may display the first time in the form of a timer ml in the first display area 210, as illustrated in FIG. 11.

Also, the second area 220 of the user equipment 200 illustrated in FIG. 11 may show how the temperature of the food placed in the container 320 changes over time in the form of a graph gi.

Meanwhile, referring to FIG. 16, a process in which the artificial intelligent food refrigerating device 300 regulates the temperature inside the container 320 will be described.

Figure 16:
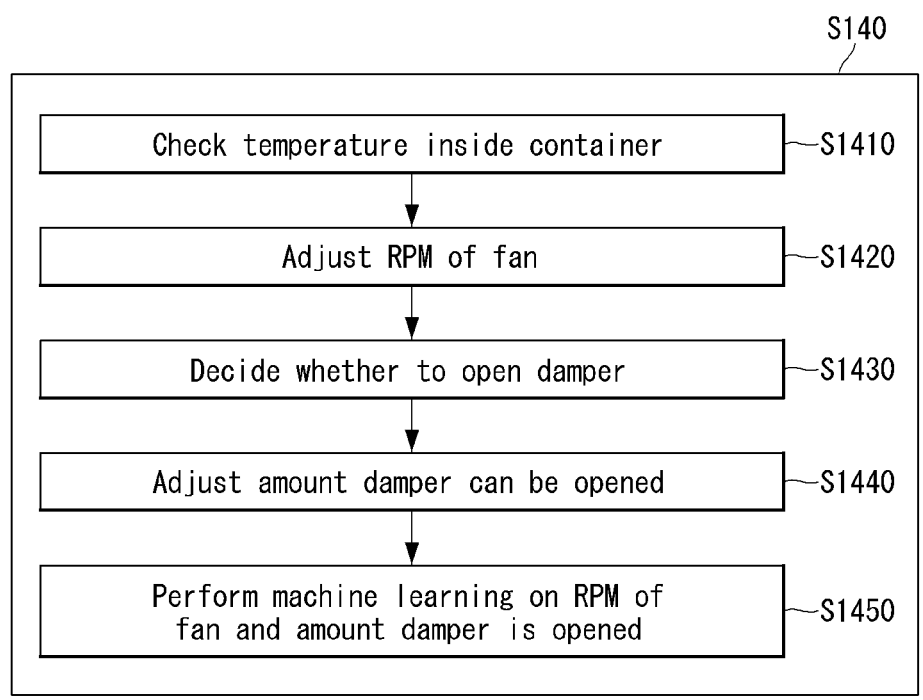
FIG. 16 is a sequential diagram showing a method in which an artificial intelligent food refrigerating device regulates the temperature inside the container according to an exemplary embodiment of the present disclosure.

FIG. 16 is a sequential diagram showing a method in which an artificial intelligent food refrigerating device 300 regulates the temperature inside the container 320 according to an exemplary embodiment of the present disclosure.

Firstly, the controller 360 of the artificial intelligent food refrigerating device 300 measures the temperature inside the container 320 through the third temperature sensor 341 (S1410). Then, if it is decided that the temperature inside the container 320 needs to be reduced, the controller 360 adjusts the RPM of the fan 351 (S1420) and sends cool air released from the cool air outlet of the refrigeration compartment 11 or freezer compartment 12 into the container 320.

Afterwards, the controller 360 decides whether to open the damper 352 or not (S1430). That is, if it is decided that the temperature inside the container 320 is rather high and that the difference between the temperature of the food placed in the container 320 and the target refrigeration temperature is large, the controller 360 closes the damper 352 to concentrate on lowering the temperature inside the container 320 (S1420).

However, if it is decided that the temperature inside the container 320 is lowered enough and that the food placed in the container 320 has come close to or reached the target refrigeration temperature, the controller 360 decides to open the damper 352 (S1430).

Particularly, if the controller 360 decides to open the damper 352, the controller 360 may set the angles of rotation of a plurality of blades 3521, 3522, and 3523 included in the damper 352 and adjust the amount the damper 352 is opened in percentage (S1440).

Assuming that the angles of rotation of the blades 3521, 3522, and 3523 can be adjusted between 0 degrees and 90 degrees—for example, the controller 360 controls the blades 3521, 3522, and 3523 to rotate by 20 degrees, it can be seen that the damper 352 is open 20 to 30 percent.

Once the damper 352 is thusly opened, the air staying inside the container 320 exits the container 320 through a side of the artificial intelligent food refrigerating device 300 where the damper 352 is installed.

Also, the cool air released from the cool air outlet of the refrigeration compartment 11 or freezer compartment 12 of the artificial intelligent refrigerator 100 passes directly through the container 320 and enters the refrigeration compartment 11 or freezer compartment 12. Accordingly, the refrigeration compartment 11 or freezer compartment 12 of the artificial intelligent refrigerator 100 may be kept at a set temperature.

Meanwhile, aside from whether the damper 352 is opened or not, the fan 351 is operated by the control of the controller 360. If the damper 352 is closed, the fan 351 serves to force cool air coming from the cool air outlet of the refrigeration compartment 11 or freezer compartment 12 into the container 320.

Therefore, as illustrated in FIG. 9, if the damper 352 is closed, the cool air released from the cool air outlet of the refrigeration compartment 11 or freezer compartment 12 and admitted to the container 320 through the left side 3011 of the main body 301 does not pass through the right side 3012 of the main body 301 having a mesh structure but stays inside the container 320.

The cool air admitted into the container 320 exchanges heat with the food placed inside the container 320, and its temperature rises over a given period of time.

The controller 360 measures the air temperature inside the container 320 and releases it out of the container 320 if the air temperature rises to a certain temperature or higher. To this end, the controller 360 may open the damper 352.

Once the damper 352 is opened, the fan 351 also sends the air staying inside the container 320 to the refrigeration compartment 11 or freezer compartment 12. Also, the fan 351 allows the cool air coming from the cool air outlet of the refrigeration compartment 11 or freezer compartment 12 to pass through the container 320 and enter the refrigeration compartment 11 or freezer compartment 12.

That is, the damper 352 is configured to open and close the opposite side of the side where the main body 301 of the artificial intelligent food refrigerating device 300 faces the cool air outlet of the refrigeration compartment 11 or freezer compartment 12 of the artificial intelligent refrigerator 100.

For example, as illustrated in FIG. 9, the damper 352 is installed on the right side 3012 of the main body 301, and such a damper 352 is configured to open and close the right side 3012 of the main body 301.

Moreover, the artificial intelligent food refrigerating device 300 performs machine learning on how much the damper 352 opens depending on the angles of rotation of the blades 3521, 3522, and 3523 included in the damper 352 and how much of the air staying inside the container 320 is released out of the container 320 (S1450).

Also, the artificial intelligent food refrigerating device 300 performs machine learning on how much air can be admitted into the container 320 depending on the RPM of the fan 351.

Accordingly, the artificial intelligent food refrigerating device 300 according to the present disclosure allows cool air released from the artificial intelligent refrigerator 100 to flow into the container 320. Also, the artificial intelligent food refrigerating device 300 according to the present disclosure measures the temperature of cool air that has exchanged heat with food while staying inside the container 320 for a certain period of time, and, if it is decided that the temperature of the air has risen, opens the damper 352 to release the air staying inside the container 320 out of the container 320.

In this process, the artificial intelligent food refrigerating device 300 may additionally use the fan 351 to quickly circulate the air inside the container 320.

That is, the artificial intelligent food refrigerating device 300 according to this exemplary embodiment may actively regulate the temperature inside the container 320 by using the fan 351 and the damper 352, in order to regulate the temperature inside the container 320.

Meanwhile, after the step S140, the artificial intelligent food refrigerating device 300 according to this exemplary embodiment decides whether the food placed inside the container 320 has reached the second food temperature, which is the target refrigeration temperature (S150).

If the food placed inside the container 320 has not reached the second food temperature, which is the target refrigeration temperature, the artificial intelligent food refrigerating device 300 regulates the temperature inside the container 320 again by controlling the operations of the fan 351 and damper 352 (S140).

On the other hand, after the step S140, if it is decided that the food placed inside the container 320 has reached the second food temperature, which is the target refrigeration temperature, the artificial intelligent food refrigerating device 300 controls the damper 352 to open (S160). Then, the damper 352 is opened so that the temperature in the refrigeration compartment 11 or freezer compartment 12 is controlled by the cool air released from the cool air outlet of the artificial intelligent refrigerator 100.

Meanwhile, the artificial intelligent food refrigerating device 300 may display an alarm indicating the completion of refrigeration of the food being stored in the container 320 (S170). Such an alarm indication may be displayed directly through the display provided in the artificial intelligent food refrigerating device 300, or may be displayed through user equipment 200 that can communicate data with and interface with the artificial intelligent food refrigerating device 300.

That is, to display an indication of completion of refrigeration on the user equipment 200, the artificial intelligent food refrigerating device 300 may send an indication of completion of refrigeration directly to the user equipment 200, and the user equipment 200 may display the indication of completion of refrigeration through an application for interfacing with the artificial intelligent food refrigerating device 300.

The present disclosure may be embodied as computer-readable code on a medium on which a program is recorded. The computer-readable medium includes all kinds of recording devices in which data that may be read by a computer system is stored. Examples of the computer-readable media include a hard disk drive (HDD), a solid state disk (SSD), a silicon disk drives (SDD), a ROM, a RAM, a CD-ROM, a magnetic tape, a floppy disk, optical data storage, and the like. Further, the examples of the computer-readable media include a form of a carrier wave (e.g., transmission over Internet). Thus, the detailed description above should not be construed as limiting in all aspects but should be construed as illustrative. The scope of the present disclosure should be determined by reasonable interpretation of the appended claims, and all changes within the equivalent scope of the present disclosure are included in the scope of the present disclosure.

What is claimed is:

1. An artificial intelligence (AI) food refrigerating device comprising:
   a main body to be placed in an AI refrigerator;
   a container shaped to define a space inside the main body and configured to receive food therein;
   a door for opening and closing the container;
   an camera configured to capture an image of the food and an interior of the container;
   a sensor configured to measure status information of the interior and exterior of the container;
   a temperature regulator configured to regulate temperature inside the container;
   a transceiver configured to perform data communication with at least the AI refrigerator or an external device;
   a processor;
   a memory having stored thereon computer-readable instructions, which when executed by the processor, cause the AI food refrigerating device to recognize a size, volume, type, and quantity of the food to be put into the container using the captured image and control the temperature regulator to regulate the temperature inside the container according to a recognition result of the food,
   wherein execution of the stored instructions further cause the AI food refrigerating device to determine based on the recognition result:
   a first food temperature of the food before the food is placed into the container;
   a second food temperature which is a target temperature for refrigerating the food;
   a first container temperature which is a temperature inside the container for achieving the second food temperature; and
   a first time period required to achieve the second food temperature.

2. The AI food refrigerating of claim 1, wherein, based on the food being identified as liquid based on the recognition result, the second food temperature is within a first range, and based on the food being identified as non-liquid based on the recognition result, the second food temperature is within a second range.

3. The AI food refrigerating device of claim 2, wherein the first range and the second range are determined based on training using recognition results by machine learning.

4. The AI food refrigerating device of claim 1, wherein, based on the food being identified as liquid based on the recognition result, the first time period is within a third range, and based on the food being identified as non-liquid based on the recognition result, the first time period is within a fourth range.

5. The AI food refrigerating device of claim 4, wherein the third range and the fourth range are determined based on training using recognition results by machine learning.

6. The AI food refrigerating device of claim 1, wherein the camera further comprises forward-looking infrared (FLIR) camera, wherein the FUR camera is configured to generate a first image by capturing the food before or when the food is placed into the container, and execution of the stored instructions further cause the AI food refrigerating device to determine a temperature of the food by analyzing the first image.

7. The AI food refrigerating device of claim 6, wherein the FLIR camera is further configured to periodically capture images of the food in the container, and execution of the stored instructions further cause the AI food refrigerating device the to identify a change in the temperature of the food by analyzing the periodically captured images.

8. The AI food refrigerating device of claim 1, wherein the first food temperature, the second food temperature, and the first time period are outputted through at least the AI refrigerator or the external device.

9. The AI food refrigerating device of claim 1, wherein the main body comprises a on at least one side,
wherein the mesh is configured such that cool air passes into the container from a cool air outlet of the AI refrigerator.

10. The AI food refrigerating device of claim 9, wherein the main body comprises a connecting portion configured to be attached around the cool air outlet,
wherein the mesh is disposed to come into contact with or in close proximity to the cool air outlet via the connecting portion.

11. The AI food refrigerating device of claim 1, wherein the temperature regulator comprises a fan configured to input air into the container,
wherein execution of the stored instructions further cause the AI food refrigerating device to control the fan according to the recognition result.

12. The AI food refrigerating device of claim 11, wherein the temperature regulator further comprises a damper for opening and closing one side of the container,
wherein execution of the stored instructions further cause the AI food refrigerating device to control the damper based on at least the recognition result, the temperature inside the container, an operation mode of the fan, or a temperature of a refrigeration compartment of the AI refrigerator.

13. The AI food refrigerating device of claim 12, wherein the damper comprises a plurality of blades,
wherein the plurality of blades are disposed in parallel at one side of the main body and configured to rotate within a given angular range.

14. The AI food refrigerating device of claim 1, wherein the temperature outside the container is set as the first food temperature.

15. The AI food refrigerating device of claim 1, wherein the sensor further comprises:

a second temperature sensor for measuring temperature outside the container; and
a third temperature sensor for measuring the temperature inside the container and temperature of the food inside the container,
wherein execution of the stored instructions further cause the AI food refrigerating device to monitor a change in the temperature of the food inside the container via the third temperature sensor.

16. A method for refrigerating food by using an artificial intelligence (AI) food refrigerating device, the method comprising:
recognizing a size, volume, type, and quantity of food placed into a container inside the AI food refrigerating device;
determining a first food temperature of the food before the food is placed into the container, a second food temperature which is a target food temperature for refrigerating the food, a first container temperature which is a temperature inside the container for achieving the second food temperature, and a first time period required to achieve the second food temperature;
regulating the temperature inside the container based on a recognition result of the food; and
displaying the target food temperature and the first time period to a user.

17. The method of claim 16,
wherein the determining the first food temperature comprises analyzing an image of the food captured by a forward-looking infrared (FLIR) camera before the food is placed into the container or determining a temperature outside the container as the first food temperature.

18. The method of claim 16, wherein the regulating of the temperature inside the container comprises:
controlling operation of a fan; and
controlling operation of a damper,
wherein the fan comprises at least one operation mode based on revolutions per minute (RPM) of the fan, and the damper comprises at least one operation mode based on angles of rotation of blades comprised in the damper.

19. The method of claim 16, wherein the displaying of the second food temperature and the first time period comprises:
sending information about the second food temperature and the first time period to at least an AI refrigerator or an external device; and
causing output of the second food temperature and the first time period through at least one of the AI refrigerator or the external device.

* * * * *